US009552469B2

(12) United States Patent
Jin et al.

(10) Patent No.: US 9,552,469 B2
(45) Date of Patent: Jan. 24, 2017

(54) IDENTITY AUTHENTICATION BY USING HUMAN BIOLOGICAL CHARACTERISTIC

(71) Applicant: Alibaba Group Holding Limited, Grand Cayman, KY (US)

(72) Inventors: Weian Jin, Hangzhou (CN); Mian Huang, Hangzhou (CN); Xiaoling Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 112 days.

(21) Appl. No.: 14/541,928

(22) Filed: Nov. 14, 2014

(65) Prior Publication Data

US 2015/0143497 A1 May 21, 2015

(30) Foreign Application Priority Data

Nov. 15, 2013 (CN) .......................... 2013 1 0571710

(51) Int. Cl.
*G06F 7/04* (2006.01)
*G06F 21/32* (2013.01)
(Continued)

(52) U.S. Cl.
CPC .......... *G06F 21/32* (2013.01); *G06K 9/00885* (2013.01); *G06K 9/00926* (2013.01); *G06K 9/6227* (2013.01); *G06K 2009/00583* (2013.01)

(58) Field of Classification Search
CPC ... G06F 21/32; G06K 9/0885; G06K 9/00926; G06K 9/6227
See application file for complete search history.

(56) References Cited

U.S. PATENT DOCUMENTS 8,856,541 B1 * 10/2014 Chaudhury ............. G06F 21/32
382/115
9,251,401 B1 * 2/2016 Koo ................... G06K 9/00288
(Continued)

FOREIGN PATENT DOCUMENTS

WO WO2004019164 3/2004

OTHER PUBLICATIONS

Filler, et al., "Using Sensor Pattern Noise for Camera Model Identification", 15th IEEE International Conference on Image Processing: ICIP 2008, San Diego, CA, USA, Oct. 12-15, 2008, IEEE, pp. 1296-1299.
(Continued)

*Primary Examiner* — Techane Gergiso
(74) *Attorney, Agent, or Firm* — Lee & Hayes, PLLC

(57) ABSTRACT

A human biological characteristic file corresponding to a particular identity is received and used as a base file. A characteristic code to be authenticated is obtained according to a human biological characteristic of a person who requests identity authentication when an identity authentication request corresponding to the particular identity is received. A base characteristic code is collected from a base file. A collecting algorithm applied for collecting the base characteristic code is the same as or matches an algorithm applied for obtaining the characteristic code. The present techniques determine whether the base characteristic code and the characteristic code correspond to a same human biological characteristic. If a result is positive, the identity authentication request is verified. The present techniques implement communication between different terminal devices of different manufacturers and effectively improve user experiences, thereby efficiently and conveniently implementing remote identity authentication.

20 Claims, 6 Drawing Sheets

(51) Int. Cl.
*G06K 9/00* (2006.01)
*G06K 9/62* (2006.01)

(56) References Cited

U.S. PATENT DOCUMENTS

| | | | | |
|---|---|---|---|---|
| 2004/0005087 | A1* | 1/2004 | Hillhouse | G06F 21/32 382/125 |
| 2004/0017934 | A1* | 1/2004 | Kocher | G06K 9/00906 382/125 |
| 2004/0255168 | A1* | 12/2004 | Murashita | G06K 9/00885 726/5 |
| 2005/0286745 | A1* | 12/2005 | Kamata | G06K 9/00013 382/115 |
| 2007/0150745 | A1 | 6/2007 | Peirce et al. | |
| 2008/0065901 | A1* | 3/2008 | Takaku | G06F 21/32 713/186 |
| 2008/0215890 | A1* | 9/2008 | Buer | H04L 9/3231 713/186 |
| 2009/0185723 | A1* | 7/2009 | Kurtz | G06K 9/00288 382/118 |
| 2010/0257369 | A1* | 10/2010 | Baker | G06F 21/32 713/186 |
| 2011/0087611 | A1 | 4/2011 | Chetal | |
| 2011/0123072 | A1* | 5/2011 | Moon | G06K 9/00093 382/125 |
| 2011/0188709 | A1* | 8/2011 | Gupta | G06F 21/32 382/115 |
| 2011/0243396 | A1 | 10/2011 | Hama et al. | |
| 2012/0098948 | A1* | 4/2012 | Lee | A61B 5/1172 348/77 |
| 2012/0189170 | A1 | 7/2012 | Uno et al. | |
| 2012/0300988 | A1 | 11/2012 | Ivanov et al. | |
| 2012/0328165 | A1 | 12/2012 | Watanabe | |
| 2013/0173926 | A1 | 7/2013 | Morese et al. | |
| 2013/0188840 | A1* | 7/2013 | Ma | G06K 9/00221 382/107 |
| 2013/0227664 | A1 | 8/2013 | McKay | |
| 2014/0016839 | A1 | 1/2014 | Uno et al. | |
| 2014/0056492 | A1 | 2/2014 | Geosimonian | |
| 2014/0062658 | A1 | 3/2014 | Vrijen et al. | |
| 2014/0241597 | A1 | 8/2014 | Leite | |

OTHER PUBLICATIONS

PCT Search Report and Written Opinion mailed May 8, 2015 for PCT Application No. PCT/US14/65759, 11 Pages.

\* cited by examiner

IDENTITY AUTHENTICATION BY USING HUMAN BIOLOGICAL CHARACTERISTIC

CROSS REFERENCE TO RELATED PATENT APPLICATION

This application claims foreign priority to Chinese Patent Application No. 201310571710.5 filed on 15 Nov. 2013, entitled "METHOD AND DEVICE OF IDENTITY AUTHENTICATION BY USING HUMAN BIOLOGICAL CHARACTERISTIC", which is hereby incorporated by reference in its entirety.

TECHNICAL FIELD

The present disclosure is related to the field of identity authentication, and, more particularly, to a method of identity authentication by using human biological characteristics. The present disclosure also provides a device for performing identity authentication by using human biological characteristics.

BACKGROUND

With the development of society and the progress of technology, there is a high requirement in security and convenience for access control. Therefore a scheme that achieves an automatic, rapid, accurate and secure identity authentication has become a basic requirement in many network operations. Accordingly, conventional methods for identity authentication such as a password, a pass code, or an identification card are no longer capable of meeting the new requirement.

In recent years, a new technique that achieves identity authentication by using human biological characteristics such as a fingerprint, a palm print, a human face, a facial characteristic, or a voice pattern has gradually gained attention. The basic steps are as follows.

First, a user is required to perform a registration of his/her human biological characteristics, i.e., the user inputs a human biological characteristic and then a characteristic code is collected and stored. Next, whenever the user is required to perform an identity authentication, he/she is required to input the human biological characteristic and his/her characteristic code is collected again, and then the collected characteristic code is compared to the characteristic code which is stored during the registration to determine whether the two codes match each other. Thus the process of the identity authentication is completed.

Since a human biological characteristic is unique (every human being has different biological characteristics) and permanent (the biological characteristic does not change in a lifetime), this new technique is widely promoted and applied in many fields such as financial, telecommunication, transportation, education and medical fields as well.

As the technique of human biological characteristics identification has become more and more mature, the technique has been applied in fields that require remote access control, such as on-line banking transaction, on-line payment system, and remote access of enterprise servers. In these applications, a user may use different terminal devices for registering a human biological characteristic and for sending an identity authentication request respectively. For example, the user may use a terminal device provided by the service provider to input the registered human biological characteristics, and may use a sensor of a mobile terminal device to input the human biological characteristic and send the identity authentication request for a remote login when the user is required to perform a remote access. Therefore, a new problem has occurred. Various device providers have released their own human biological characteristics collecting devices, corresponding human biological characteristics collecting algorithms, and characteristic code comparing algorithm. The human biological characteristics collecting algorithms and characteristic code comparing algorithms of different device providers are different to each other. Thus the various devices from different providers are not compatible to each other and the user is required to use the terminal devices from different providers respectively for registering his/her human biological characteristics. Otherwise the user may not be able to perform a proper identity authentication.

Using fingerprint identification technology as an example, which is the most widely applied existing technology, when a user initially has used the fingerprint collecting terminal device of a provider A to register a fingerprint, a registered fingerprint characteristic code of the user is acquired by analyzing the fingerprint image and is stored in a fingerprint database. During a next identity authentication, a fingerprint collecting terminal device of a provider B is used for acquiring a fingerprint characteristic code of the user for authentication. A fingerprint verifying center will compare the registered fingerprint characteristic code of the user acquired from the fingerprint database with the current fingerprint characteristic code. However, since the characteristics collecting algorithm applied by the two fingerprint collecting terminal devices are different and the two fingerprint characteristic codes generated thereby are different as well, no matter which comparing algorithm is used, it is impossible to obtain a correct result and consequently the user's identity authentication is failed. To avoid such a situation, the user is required to register the fingerprints on both terminal devices respectively while performing a fingerprint registration, and each collected fingerprint characteristics codes should be stored in the fingerprint database to make sure that the identity authentication may be successfully performed. Since the terminal devices from different providers are not compatible with each other, the related operating procedures have become complicated as described above, and the user's demand for achieving a rapid, convenient identity authentication may not be fulfilled. Such a problem also affects the implementation of using this new technology in the field of remote access control.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an example method for performing identity authentication by using a human biological characteristic, which achieves a more rapid and convenient remote identity authentication via a network.

The present disclosure also provides an example device for performing identity authentication using human biological characteristics.

The present disclosure provides an example method for performing identity authentication by using the human biological characteristic. An example method includes the following operations.

A human biological characteristic file corresponding to a particular identity is received and used as a base file.

A characteristic code, i.e., a characteristic code to be authenticated (or a first characteristic code), is obtained according to a human biological characteristic of a person who requests identity authentication when an identity authentication request corresponding to the particular identity is received.

A base characteristic code (or a second characteristic code) is collected from a base file. A collecting algorithm applied for collecting the base characteristic code is the same as, consistent with, or matches an algorithm applied for obtaining the characteristic code of the person who requests identity authentication according to the human biological characteristic of the person who requests identity authentication.

The present techniques determine whether the base characteristic code and the characteristic code correspond to a same human biological characteristic. If a result is positive, the identity authentication request is verified or passed.

Optionally, the step of obtaining the characteristic code according to the human biological characteristics of a person who requests the identity authentication may include the following operations.

A human biological characteristic file of the person who requests identity authentication is received.

A particular collecting algorithm is used to collect the characteristic code from the human biological characteristic file of the person who requests identity authentication.

For example, before the particular collecting algorithm is used to collect the characteristic code from the human biological characteristic file of the person who requests identity authentication, the following operations may be performed.

A type and/or a model of a terminal device of the person who requests identity authentication that provides the human biological characteristic file of the person who requests identity authentication is obtained. Alternatively, the type and/or model of the terminal device that provides the base file is obtained.

The collection algorithm used by the terminal device is obtained according to the type and/or model of the terminal device.

At the step that the particular collecting algorithm is used to collect the characteristic code from the human biological characteristic file of the person who requests identity authentication, the above collecting algorithm is used as the particular collecting algorithm.

Optionally, the step of obtaining the characteristic code according to the human biological characteristic of the person who requests identity authentication may include the following operation. The characteristic code collected by the person who requests identity authentication through the terminal device of the person who requests identity authentication is received.

Correspondingly, before the step of collecting the base characteristic code from the base file, the method may perform the following operations.

The type and/or model of the terminal device of the person who requests identity authentication is obtained. The collection algorithm used by the terminal device to collect the characteristic code is obtained according to the type and/or model of the terminal device. At the step of collecting the base characteristic code from the base file, such obtained collecting algorithm is applied as the collecting algorithm.

Optionally, after the identity authentication request for the particular identity is received, the method may perform the following operations.

The present techniques determine whether the received identity authentication request provides the human biological characteristic file of the person who requests identity authentication or the characteristic code of the person who requests identity authentication that is collected through the terminal device of the person who requests identity authentication. If the human biological characteristic file of the person who requests identity authentication is provided, the step of obtaining the characteristic code according to the human biological characteristics of the person who requests identity authentication may include the following operations.

The particular collecting algorithm is used to collect the characteristic code from the human biological characteristic file of the person who requests identity authentication. The particular collecting algorithm is applied as the collecting algorithm to collect the base characteristic code from the base file.

If the received identity authentication request provides the characteristic code of the person who requests identity authentication, which is collected by the terminal device of the person who requests identity authentication, before the step of collecting the base characteristic code from the base file, the following operations are performed.

The type and/or model of the terminal device of the person who requests identity authentication is received. According to the type and/or the model of the terminal device of the person who requests identity authentication, the collecting algorithm which is applied by the terminal device to collect the characteristic code is obtained. At the step of collecting the base characteristic code from the base file, the above collecting algorithm is applied.

Optionally, at the step of determining whether or not the base characteristic code and the characteristic code correspond to the same human biological characteristic, the base characteristic code and the characteristic code are compared by using a comparing algorithm corresponding to the collecting algorithm. A comparison result is used to determine whether or not the base characteristic code and the characteristic code correspond to the same human biological characteristic.

Optionally, the human biological characteristic may include a fingerprint, a human face, a facial characteristic, a palm print, and/or a voice pattern.

Optionally, the human biological characteristic file may include an image file and/or an audio file.

The present disclosure also provides an example device for performing identity authentication by using a human biological characteristic. The device includes a base file receiving unit, a characteristic code obtaining unit, a base characteristic code collecting unit, and a determining unit.

The base file receiving unit receives a human biological characteristic file corresponding to a particular identity and uses such file as a base file.

The characteristic code obtaining unit obtains a characteristic code according to a human biological characteristic of a person who requests identity authentication when an identity authentication request corresponding to the particular identity is received.

The base characteristic code collecting unit reads the base file received by the base file receiving unit and collects a base characteristic code from the base file. A collecting algorithm applied for collecting the base characteristic code is the same as, consist with, or matches a collecting algorithm applied for obtaining the characteristic code of the person who requests identity authentication.

The determining unit determines whether the base characteristic code and the characteristic code correspond to a same human biological characteristic and outputs a determining result.

Optionally, the characteristic code obtaining unit may include an identification file receiving sub-unit and a first characteristic code collecting sub-unit. The identification file receiving sub-unit receives the human biological characteristic file of the person who requests identity authentication.

The first characteristic code collecting sub-unit uses a particular collecting algorithm to collect the characteristic code from the human biological characteristic file of the person who requests identity authentication. The collecting algorithm used by the base characteristic code collecting unit is the above described particular collecting algorithm.

Optionally, the characteristic code obtaining unit may include a device information obtaining sub-unit and a collecting algorithm obtaining sub-unit. The device information obtaining sub-unit obtains a type and/or a model of a terminal device of the person who requests identity authentication that provides the human biological characteristic file of the person who requests identity authentication and/or a type and/or model of the terminal device that provides the base file.

The collecting algorithm obtaining sub-unit uses the type and/or model of the terminal device provided by the device information obtaining sub-unit to obtain the collection algorithm used by the terminal device.

Optionally, the characteristic code obtaining unit obtains the characteristic code of the human biological characteristic that is collected through the terminal device of the person who requests identity authentication.

Correspondingly, the device may also include a first device information obtaining unit and a first collecting algorithm obtaining unit. The first device information obtaining unit obtains the type and/or model of the terminal device of the person who requests identity authentication. The first collecting algorithm obtaining unit obtains the collection algorithm used by the terminal device to collect the characteristic code according to the type and/or model of the terminal device. The base characteristic code collecting unit receives the collecting algorithm output by the first collecting algorithm obtaining unit and uses such collecting algorithm as the collecting algorithm to collect the base characteristic code from the base file.

Optionally, the characteristic code obtaining unit includes an authentication request receiving sub-unit, a type information determining sub-unit, and a second characteristic code collecting sub-unit. The authentication request receiving sub-unit receives an identity authentication request for a particular identity.

The type determining sub-unit determines whether the received identity authentication request provides the human biological characteristic file of the person who requests identity authentication or a characteristic code that is collected by the person who requests identity authentication through the terminal device of the person who requests identity authentication.

The second characteristic code collecting sub-unit reads the determining result determined by the type determining sub-unit. If the determining result is the human biological characteristic file provided by the person who requests identity authentication, the unit is activated to use a particular collecting algorithm to collect the characteristic code from the received human biological characteristic file of the person who requests identity authentication.

The base characteristic code collecting unit uses the particular collecting algorithm applied by the second characteristic code collecting sub-unit as the collecting algorithm to collect the base characteristic code.

Correspondingly, the device may also include a second device information obtaining unit and a second collecting algorithm obtaining unit. The second device information obtaining unit reads the result determined by the type information determining sub-unit. If the determining result is the characteristic code of the human biological characteristic collected by the person who requests identity authentication through the terminal device of the person who requests identity authentication, the second device information obtaining unit is activated to obtain the type and/or model of the terminal device of the person who requests identity authentication.

The second collecting algorithm obtaining unit reads the determining result of the type determining sub-unit. If the determining result is the characteristic code of the human biological characteristic provided by the person who requests identity authentication and collected through the terminal device of the person who requests identity authentication, the second collecting algorithm obtaining unit is activated to obtain, according to the type and/or the model of the terminal device of the person who requests identity authentication, the collecting algorithm which is applied by the terminal device to collect the characteristic code.

The base characteristic code collecting unit receives the collecting algorithm output by the second collecting algorithm obtaining unit and uses such collecting algorithm as the collecting algorithm to collect the base characteristic code.

Optionally, the determining unit may include a comparing algorithm selecting sub-unit and a comparing sub-unit. The comparing algorithm selecting sub-unit selects a comparing algorithm that corresponds to the collecting algorithm applied by the characteristic code obtaining unit and the base characteristic code collecting unit.

The comparing sub-unit uses the comparing algorithm to compare whether the base characteristic code and the characteristic code correspond to the same human biological characteristic and outputs a comparing result.

The example method for identity authentication by using human biological characteristic in the present disclosure is not achieved by a scheme that compares the characteristic codes collected by different terminal devices directly. Instead, the present techniques compare human biological characteristic files. In other words, the method of the present disclosure uses the same collecting algorithm to collect the respective characteristic code from the human biological characteristic base file and the human biological characteristic file of the person who requests identity authentication to perform a comparing operation, thereby solving the issue that different identity authentication methods are used by different terminal devices for human biological characteristics provided by different providers that may not communicate with each other. Therefore, the present techniques achieve the mutual communication of different providers' terminal devices, and improve a terminal user's experience effectively. The present techniques are particularly suitable for identify authentication of a remote login via a network.

For example, if the terminal device of the person who requests identity authentication provides the human biological characteristic file of the person who requests identity authentication, the present disclosure will choose a collecting algorithm which corresponds to the terminal device that provides the base human biological characteristic file or a collecting algorithm which corresponds to the terminal device of the person who requests identity authentication as a universal collecting algorithm for collecting the base characteristic code and the characteristic code, thereby accurately and effectively collecting the characteristic doe information and achieving a better implementation effect.

For another example, when the base characteristic code and the characteristic code are compared, the present techniques choose a comparing algorithm which corresponds to the collecting algorithm for collecting the base characteristic code and the characteristic code, thereby effectively improving a comparing accuracy.

DETAILED DESCRIPTION

The details of the present disclosure are described as follows to clarify the present disclosure. The present techniques, however, may be implemented by many other methods different from those as described herein. A person of ordinary skill in the art is able to perform related modifications without violating the spirit of the present disclosure. Thus, the present disclosure is not limited by the following disclosed example embodiments.

Figure 1:
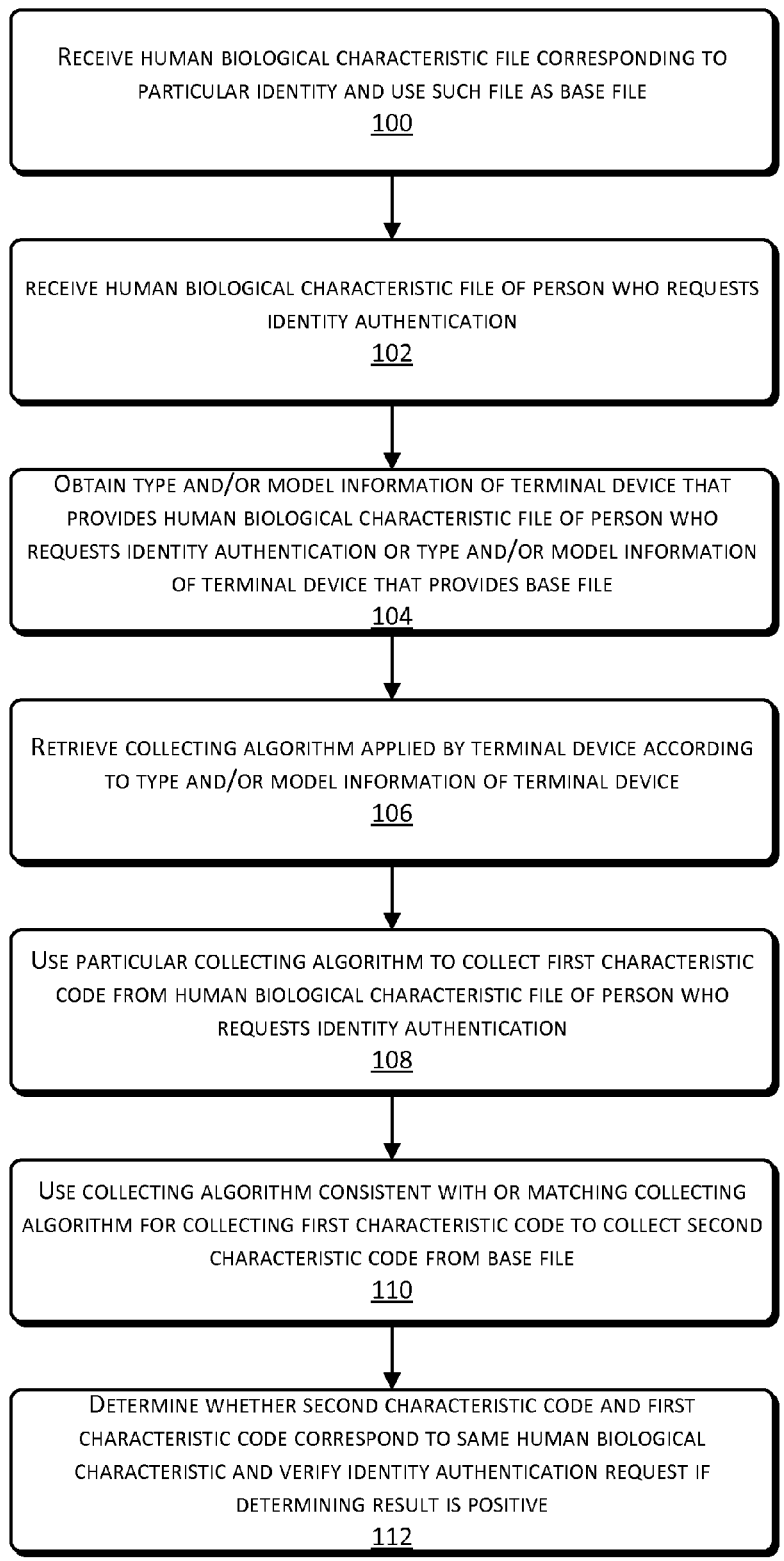
FIG. 1 is a flowchart illustrating a first example method for performing identity authentication by using a human biological characteristic according to a first example embodiment of the present disclosure.

FIG. 1 is a flowchart illustrating an example method for performing identity authentication by using a human biological characteristic according to a first example embodiment of the present disclosure. In this example embodiment, a human biological characteristic file of a person who requests an identity authentication is provided by a terminal device of the person who requests the identity authentication. The following descriptions are illustrated by reference to FIG. 1.

At step 100, a human biological characteristic file corresponding to a particular identity is received, and is used as a base file.

This step is a process that registers a user's human biological characteristic. In order to perform the method of identity authentication in the present disclosure, a user is required to initially register his/her human biological characteristic, i.e., the user inputs his/her one or more human biological characteristics through a terminal device. The terminal device, according to the human biological characteristic input by the user, generates a corresponding human biological characteristic file. When the user provides a human biological characteristic such as a fingerprint, a human face, a facial characteristic, and/or a palm print, a corresponding image file is generated by the terminal device. When the user provides a human biological characteristic in a voice pattern, a corresponding audio file is generated by the terminal device. The image file or the audio file is received by a device or a system of identity authentication and is stored therein, and thus the registering process of the human biological characteristics of the user is completed. The registered human biological characteristic file is used as a base file for performing a subsequent user's identity authentication.

After the human biological characteristic is input by the user through the terminal device and some necessary preprocessing are performed by the terminal device, the human biological characteristic file is generated by the terminal device, and a registration request is uploaded to the device or system of identity authentication. The registration request includes not only the human biological characteristic file of the user, but also an identification of the user, type information and/or model information of the terminal device used by the user for registration.

The reason for providing the user identification of the registration is that the present disclosure provides the example method of identity authentication whose purpose is to determine whether the human biological characteristic file to be authenticated of specific user identification is consistent with or matches the base file corresponding to the specific user identification. In this process, the user identification links the human biological characteristic file to be authenticated of the user with the base file. Thus, the user is required to provide unique user identification in the user's registration. The same user identification should be provided in the following initiated requests for identity authentication.

The reason that the registration request includes the type information and/or the model information of the terminal device that provides the base file is to retrieve, according to the type information and/the model information of the terminal device, a collecting algorithm and/or a comparing algorithm that corresponds to the terminal device in the following process of the identity authentication.

The registration information is extracted and stored after the registration request sent by the terminal device is received by the device or the system of identity authentication.

The terminal device may prompt the user to input the user identification by scanning an ID card, inputting through a keyboard, binding with a mobile device number, etc. The present disclosure does not limit how the terminal device acquires the user identification.

The type information and/or the model information of the terminal device may be acquired by the terminal device by reading data which is pre-written on a particular sector of a storage media, or by any other ways, which is not limited by the present disclosure.

The communication between the terminal device and the device/system of the identity authentication may be achieved by a USB interface, a network interface, or a wireless transmission interface, which is not limited by the present disclosure.

For example, a user Mr. Chang uses a fingerprint sensor of a Xiaomi 2S cell phone to input his fingerprint, and a fingerprint image file with extension file name of .jpg is generated. A user identification 0001 of Chang is acquired by the Xiaomi 2S cell phone, and a registration request of Chang is sent by the Xiaomi 2S cell phone to a fingerprint verification center system that performs identity authentication via a wireless transmission interface.

After the request uploaded by the Xiaomi 2S cell phone is received by the fingerprint verification center system, the first step is to identify whether the received request is either a registration request or an authenticating request. In general, there are two methods that may be applied: 1) the requesting information includes an identification of the request type and the requesting information will be read and determined by the fingerprint verification center system; 2) the request information does not include the identification of the request type. The fingerprint verification center system performs a search, according to the user identification provided in the request, in a fingerprint database where the registration information is stored. If registration information corresponding to the user identification is not found in the fingerprint database, the present techniques indicate that the user identification is not yet registered. After the present techniques determine that the request uploaded by the terminal device is the registration request, the information provided in the registration request is extracted by the fingerprint verification center system, and is stored, in an example format as shown in the following table, in the fingerprint database. The fingerprint registering process of the user Chang is completed.

Example of a fingerprint database

| User identification | Fingerprint image | Terminal type and/or model |
|---|---|---|
| 0001 | \fpimg\0001.jpg | Xiaomi 2S cell phone |
| ... | ... | ... |

It is noted that in this example embodiment, the fingerprint image file is stored in a particular file directory with a name of "fpimg," and a storage path and a file name of the fingerprint image file are written into a column of Fingerprint image in the fingerprint database. The fingerprint image file is read by accessing the path whenever the fingerprint image file registered by Chang needs to be extracted.

For another example, the user uses a voice for the registration. After the registration request from the user is received by the device or the system of identify authentication, the received audio file is stored in a specific directory of file with a similar manner as described above. The storage path and the specific file name of the audio file are stored in the corresponding database, so that the corresponding audio file is read by accessing the path when the audio file registered by the user needs to be extracted.

For another example, the registration information of user may be stored in an ordinary data file or in a data table if the registered information of the user may be extracted according to the requirement. The database, data file, and data table may be locally stored in the device or system of identity authentication, or stored in another network storage device. The practical storage manner and location is not limited by the present disclosure.

At step 102, a human biological characteristic file of the person who requests identity authentication is received.

The terminal device, which is capable of providing the human biological characteristic file, is used by the person who requests identity authentication to input his/her human biological characteristic. Then a human biological characteristic file of the person who requests identity authentication is generated by the terminal device, and accordingly the file is received by the device or the system of identity identification.

In addition to the human biological characteristic file of the person who requests identity authentication, the identity authentication request sent by the terminal device of the person who requests identity authentication may further include a user identification of the person who requests identity authentication and type information and/or model information of the terminal device of the person who requests identity authentication. The user identification of the person who requests identity authentication is used to extract a registered human biological characteristic file, i.e., the base file, from the stored human biological characteristic data. The type information and/or model information of the terminal device of the person who requests identity authentication is used to acquire a collecting algorithm and a comparing algorithm corresponding to the terminal device.

For example, the user Mr. Chang is required to perform a remote identity authentication when he uses a software application of an iPhone™ 4S cell phone. Mr. Chang inputs his fingerprint image through the fingerprint sensor of the iPhone™ 4S cell phone, and thereafter the iPhone™ 4S cell phone directly uploads to the fingerprint verification center system a fingerprint image file "varify_0001.jpg" of Mr. Chang, a user identification "0001" of Mr. Chang, and the type information and/or model information of the terminal device. The fingerprint verification center system receives the information to be authenticated.

At step 104, the type and/or model information of the terminal device that provides the human biological characteristic file of the person who requests identity authentication is obtained. Alternatively, the type and/or model information of the terminal device that provides the base file is obtained.

The user identification of the person who requests identity authentication and the type information and/or the model information of the terminal device of the person who requests identity authentication are included in the identity authentication request uploaded by the terminal device. So the request is read directly to obtain the type information and/or the model information of the terminal device of the person who requests identity authentication. Alternatively, the present techniques, according to the user identification of the person who requests identity authentication, visit stored human biological characteristic data and search the type information and/or the model information of the terminal device, corresponding to the user identification of the person who requests identity authentication, that is used for registration (i.e., the type and/or model of the terminal device that provides the base file).

Since the human biological characteristic file of the person who requests identity authentication instead of the characteristic code of the human biological characteristic of the person who requests identity authentication is received by the device or system of identity authentication, a specific collecting algorithm is applied to collect the characteristic code from the human biological characteristic file of the person who requests identity authentication. No matter whether the human biological characteristic file provided by the user is an image file or an audio file, a selection of collecting algorithm is involved. The following describes the selection of the collecting algorithm by using an image of human biological characteristic as an example. The selection of the collecting algorithm for identity authentication based on voice pattern applies the same or similar principle.

Since the image of human biological characteristic input from the terminal device by the user is usually a gray scaled image having many noises, the terminal device usually needs to perform a pre-processing operation to improve the quality of the image of human biological characteristics by removing the noises to obtain a clear bitmap image. However, the image acquiring methods of different terminal devices from different providers are different from each other. The pre-processing algorithms are not the same as well. Thus eventually the images of human biological characteristic acquired by different terminal devices may have different resolutions, contrasts, and noises. Therefore the providers of the terminal device may apply a specific collecting algorithm and a specific comparing algorithm, by considering the targeted features of the images generated by their own devices, to collect characteristic points with regard to specific positions and quantity and perform a directed comparison to achieve an optimal recognizing effect. In other words, the collecting algorithm carried by the terminal device that provides the image may be the most reasonable. Considering the requirement of communication between terminal devices from different providers, a universal collecting algorithm is required in order to collect characteristic codes from images of human biological characteristics provided by different devices. Theoretically, a universal collecting algorithm may be applied. However, for the purpose of acquiring a more satisfactory effect, a collecting algorithm of the terminal device that provides the base image, or a collecting algorithm of the terminal device of a person who requests identity authentication may be applied.

According to the above consideration, in this example embodiment, the present techniques choose either the Xiaomi 2S cell phone that provides the registered fingerprint image file of Mr. Chang, i.e., the base file, or the iPhone™ 4S™ cell phone that provides the fingerprint image file to be authenticated of Chang, and then select a collecting algorithm that corresponds to the type information and/or the model information of the devices. For example, the Xiaomi 2S cell phone is selected.

At step 106, according to the type and/or the model information of the terminal device, a collecting algorithm applied by the terminal device is retrieved.

According to the type information and/or the model information of the terminal device selected at the step 104, preset human biological characteristic identification algorithm configuration information is searched and the collecting algorithm that corresponds to the type information and/or the model information of the selected terminal device is retrieved. In the preset human biological characteristic identification algorithm configuration information, with respect to each type of terminal device, the type and/or the model of the terminal device and the collecting algorithm and the comparing algorithm corresponding to the terminal device are preset. The human biological characteristic identification algorithm configuration information is preset, which may be in a form of a table or stored as a database, and stored locally on the device or system of identity authentication or any other devices. The specific storage format and location are not limited by the present disclosure.

According to this example embodiment, with respect to the Xiaomi 2S cell phone which is selected at step 104, a fingerprint collecting algorithm A001 that corresponds to the Xiaomi 2S cell phone is acquired by accessing the preset fingerprint recognizing algorithm configuration table as shown below, according to the type information and/or the model information of the Xiaomi 2S cell phone.

| Fingerprint Recognizing Algorithm Configuration Table | | |
|---|---|---|
| Terminal type and/or Model | Fingerprint collecting algorithm | Fingerprint comparing algorithm |
| Xiaomi 2S cell phone | Collecting algorithm A001 | Comparing algorithm B001 |
| iPhone ™ 4S cell phone | Collecting algorithm A002 | Comparing algorithm B002 |
| Door pass recognizing device model A | Collecting algorithm A003 | Comparing algorithm B003 |

At step 108, a characteristic code is collected, by use of a particular collecting algorithm, from the human biological characteristic file of the person who requests identity authentication.

After the collecting algorithm is selected, the present techniques use the collecting algorithm to collect the characteristic code. For example, the software of the fingerprint verification center system is written in Java™ programming language, and a functional calling interface of the fingerprint collecting algorithm A001 is provided in the dynamic-link library (DLL) that is written in C programming language and provided by the Xiaomi 2S cell phone manufacturer. Thus the characteristic code to be authenticated is acquired through applying a Java Native Interface (JNI) method, using a fingerprint image file to be authenticated as the input, and retrieving the functional interface of the fingerprint collecting algorithm A001 provided by the DLL.

At step 110, a base characteristic code is collected from the base file. The algorithm applied for collecting the base characteristic code is the same as, consistent with, or matches the algorithm applied for acquiring the characteristic code.

After the characteristic code is acquired, the present disclosure further collects the base characteristic code.

First, the base file of the person who requests identity authentication is read. For example, the registered fingerprint image file of the user Chang, i.e., the base file, is stored in the fingerprint database at step S100. According to the user identification 0001 provided by Chang at the step of sending the identity authentication request, a corresponding data record of the user identification 0001 is found from the fingerprint database. For instance, with respect to an example fingerprint database, a SQL script line such as "select * from fp_db where user_id=0001" or similar SQL languages may be used. Other searching methods with respect to other data file formats and storage locations may be applied in other examples. The present disclosure does not impose any limitation. After the corresponding data record is found, the present techniques extract the registered type information and/or model information, i.e., Xiaomi 2S cell phone and the storage path and the file name of the registered fingerprint image file, and access the path and read the registered fingerprint image file "0001.jpg".

In other examples, such that the voice pattern is used to perform the user identity authentication, some similar operations are performed. That is, the registered data is accessed according to the user identification provided by the user at the step of sending the identity authentication request. The data record that corresponds to the user identification is searched. The registered type information and/or model information of the device and the registered storage path and file name of the audio file are extracted. The path is visited and the registered audio file is read.

Further, the base characteristic code is collected from the base file. The collecting algorithm applied here is the same as, consistent with, or matches the algorithm applied for acquiring the characteristic code at step 108, i.e., the collecting algorithm retrieved at step 106. The reason for applying the same collecting algorithm is mainly to fulfill the demand of communication of terminal devices from different providers. In this example embodiment, the fingerprint collecting algorithm A001 of the Xiaomi 2S cell phone, which is consistent with the collecting algorithm for collecting the characteristic code to be authenticated at step 108, is selected.

Then a method of JNI is used. A registered fingerprint image file, i.e., the base file, is used as an input, and the functional interface of the fingerprint collecting algorithm A001 in DLL provided by the manufacturer of the Xiaomi 2S cell phone is called to obtain the characteristic code of the registered fingerprint image, i.e., the base characteristic code.

At step 112, the present techniques determine whether or not the base characteristic code and the characteristic code correspond to the same human biological characteristic. If a result is positive, the identity authentication request is verified.

After the steps 108 and 110 are completed, the base characteristic code and the characteristic code are acquired. The present techniques compare these two codes to determine whether the person who requests identification authentication is verified.

For example, a characteristic code is not a simple numeral value or a character string. Instead, the characteristic code is a template in which the human biological characteristic information is recorded. Using the fingerprint characteristic code as an example, it records an overall characteristic of a fingerprint, such as the fingerprint pattern and the core point, and regional characteristics of the fingerprint, such as a number of ending points, a direction and a location of a bifurcation, a curvature feature. Accordingly, the determination of whether or not the two fingerprint characteristic codes are identical is not a process that simply determines whether the two fingerprint characteristic codes are equal. Instead, such determination is a process that performs a matching operation of the two templates. The process is a pattern recognition whose determination criterion is not whether they are equal or not. Instead, the criterion is the similarity degree between them. The judgment to the degree of similarity is related to the type and the number of the characteristics collected by using the collecting algorithm. The more the characteristics are collected, the smaller the possibility of misjudgment becomes. Accordingly, with respect to the characteristic codes collected by use of the collecting algorithm provided by a specific terminal provider, a comparing algorithm that corresponds to the collecting algorithm provided by the specific terminal provider should be applied at the step of matching so that the type and the number of the characteristics and other features in the template may be recognized accurately, thereby enhancing the matching accuracy.

Based on the above, the example method for performing identity authentication by using human biological characteristics according to the present disclosure applies a comparing algorithm that corresponds to the collecting algorithm that is applied at steps 108 and 110 for determining whether or not the base characteristic code and the characteristic code correspond to the same human biological characteristics.

For example, the collecting algorithm A001 of the Xiaomi 2S cell phone is applied at steps 108 and 110. Through searching the preset fingerprint recognizing algorithm configuration table, a comparing algorithm B001 that corresponds to the collecting algorithm A001 of the Xiaomi 2S cell phone is retrieved. Similarly, by using the JNI method, a characteristic code of the registered fingerprint image file, i.e., the base characteristic code, and the characteristic code to be authenticated are used as input, and the functional interface of the fingerprint collecting algorithm B001 in the DLL which is provided by the manufacturer of the Xiaomi 2S cell phone is also retrieved to perform a matching operation. The present techniques determine that the characteristic code and the base characteristic code correspond to a same user's fingerprint according to a similarity degree between the two fingerprint characteristic codes. The matching result will be sent back to the iPhone™ 4S cell phone of Mr. Chang, and thus the remote identity authentication of Mr. Chang is verified and he is able to proceed to operation of other remote applications.

In the first example embodiment, Mr. Chang uses a Xiaomi 2S cell phone to registered fingerprint information, and then he uses an iPhone™ 4S cell phone to perform a remote identity authentication. In the existing technology, the fingerprint characteristic codes uploaded by the two terminal devices are directly matched by the fingerprint verification center system to conclude that the fingerprints are not from a same user. It will cause the failure of identity authentication of Mr. Chang. According to the example method for performing identity authentication by using human biological characteristics of the present disclosure, a same collecting algorithm, i.e., the collecting algorithm of the Xiaomi 2S cell phone, is applied for collecting the characteristic code of the registered fingerprint image file of Mr. Chang and the fingerprint image file to be authenticated uploaded by the iPhone™ 4S, and a corresponding comparing algorithm, i.e., the comparing algorithm of the Xiaomi 2S cell phone, is applied for matching the two collected characteristic codes. Thus the remote identity authentication is successfully verified, and the mutual use or communication of the terminal devices of different providers is achieved.

Figure 2:
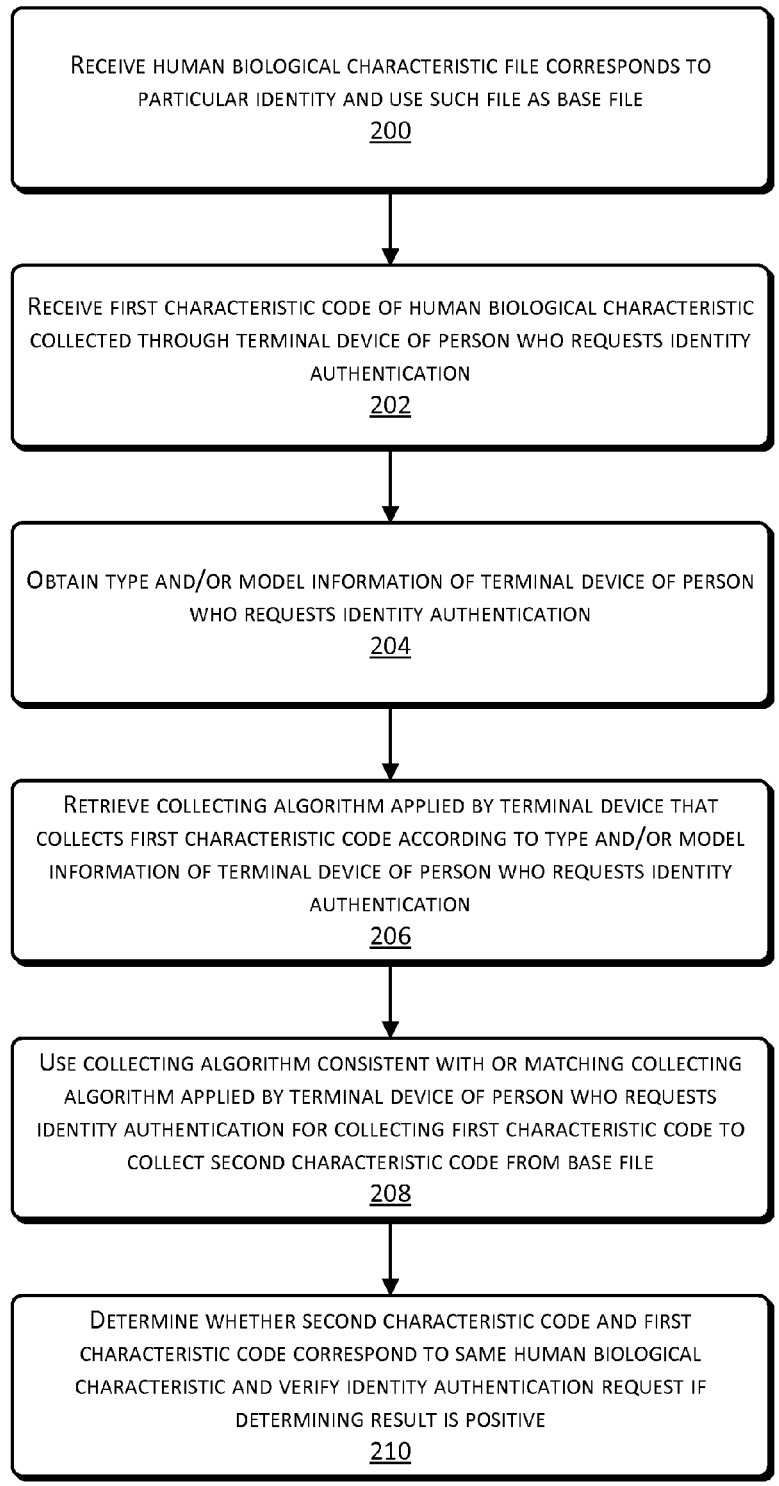
FIG. 2 is a flowchart illustrating a second example method for performing identity authentication by using a human biological characteristic according to a second example embodiment of the present disclosure.

FIG. 2 is a flowchart illustrating an example method for performing identity authentication by using a human biological characteristic according to a second example embodiment of the present disclosure. In this example embodiment, a characteristic code of a person who requests an identity authentication is provided by a terminal device of the person who requests the identity authentication. The steps in this example embodiment that are similar to the steps of the first embodiment will be omitted herein. The differences between them are emphasized in the following description by reference to FIG. 2.

At step 200, a human biological characteristic file of a particular identity is received, and is used as a base file.

For example, Mr. Chang uses a Xiaomi 2S cell phone to registered fingerprint information. A user identification "0001" of Mr. Chang, a fingerprint image file "0001.jpg" to be registered and a type information and/or a model information of the Xiaomi 2S cell phone are uploaded by the Xiaomi 2S cell phone and received by the fingerprint verification center system, and are stored in the fingerprint database. The fingerprint registering process of Mr. Chang is completed.

At step 202, a characteristic code of human biological characteristic collected by the person who requests identity authentication through the terminal device of the person who requests identity authentication is received.

The terminal device, which is capable of providing the characteristic code, is used by the person who requests identity authentication to input his/her human biological characteristic. Then after a necessary pre-process is applied to the human biological characteristic input by the person who requests identity authentication, a characteristic code of the person who requests identity authentication is collected by the terminal device by using its own collecting algorithm, i.e., the collecting algorithm that corresponds to the terminal device of the person who requests identity authentication. Then an identity authentication request is sent, and the characteristic code of the person who requests identity authentication is received by the device or the system of identity identification.

In addition to the characteristic code to be authenticated, the identity authentication request sent by the terminal device of the person who requests identity authentication further includes a user identification of the person who requests identity authentication and type information and/or model information of the terminal device of the person who requests identity authentication. The user identification of the person who requests identity authentication is used to extract a registered file of human biological characteristics, i.e., the base file, from the registered human biological characteristic data, and the type information and/or model information of the terminal device of the person who requests identity authentication is used to acquire a collecting algorithm and a comparing algorithm that correspond to the device.

For example, Mr. Chang is required to perform a remote identity authentication when Mr. Chang uses a software application of an iPhone™ 4S cell phone. Mr. Chang inputs his fingerprint image through the fingerprint sensor of the iPhone™ 4S cell phone. The iPhone™ 4S cell phone uses its originally installed fingerprint collecting algorithm A002 to collect a characteristic code to be authenticated from the fingerprint image input by Mr. Chang, and sends an identity authentication request to the fingerprint verification center system. The request includes the characteristic code to be authenticated, the user identity 0001 of Mr. Chang, and the type information and/or model information of the iPhone™ 4S cell phone. The fingerprint verification center system receives these request information.

At 204, the type and/or model information of the terminal device that requests identity authentication is acquired.

In order to fulfill the demand of mutual communication between terminal devices of different providers, the collecting algorithm for collecting the base characteristic code is required to be the same as the collecting algorithm for collecting the characteristic code to be authenticated. Since the characteristic code to be authenticated is received by the fingerprint verification center system at step 202, the collecting algorithm which is applied by the terminal device of the person who requests identify authentication for collecting the characteristic code to be authenticated needs to be applied. To meet this requirement, the type information and/or model information of the terminal device of the person who requests identity authentication should be acquired first.

At step 202, the identity authentication request sent by the terminal device includes not only the characteristic code to be authenticated but also the type information and/or the model information of the terminal device. Thus, the corresponding information is read from the identity authentication request to obtain the type information and/or the model information of the terminal device iPhone™ 4S cell phone.

At step 206, according to the type and/or the model information of the terminal device of the person who requests identity authentication, the collecting algorithm applied by the terminal device of the person who requests identity authentication for collecting the characteristic code is retrieved.

For example, a fingerprint collecting algorithm A002 that corresponds to the iPhone™ 4S cell phone is acquired by accessing the preset fingerprint recognizing algorithm configuration table according to the type information and/or the model information of the iPhone™ 4S cell phone.

| Fingerprint recognizing algorithm configuration table | | |
| --- | --- | --- |
| Terminal type and/or Model | Fingerprint collecting algorithm | Fingerprint comparing algorithm |
| Xiaomi 2S cell phone | Collecting algorithm A001 | Comparing algorithm B001 |
| iPhone ™ 4S cell phone | Collecting algorithm A002 | Comparing algorithm B002 |
| Door pass recognizing device model A | Collecting algorithm A003 | Comparing algorithm B003 |

At step 208, a base characteristic code is collected from the base file. The collecting algorithm applied for collecting the base characteristic code is the same as, consistent with, or matches the collecting algorithm applied by the terminal device of the person who requests identity authentication for acquiring the characteristic code.

After the characteristic code is acquired, the present disclosure further collects the base characteristic code.

First, the base file of the person who requests identity authentication is read. In this example embodiment, the registered fingerprint image file of Mr. Chang, i.e., the base file, is stored in the fingerprint database at step 200. According to the user identification 0001 provided by Mr. Chang at the step of sending the identity authentication request, a corresponding data record of the user identification 0001 is found by accessing the fingerprint database. After the corresponding data record is found, the storage path and the file name of the registered fingerprint image file are extracted. The path is visited and the registered fingerprint image file "0001.jpg" is read.

Then, the base characteristic code of the base file is collected. The collecting algorithm applied herein is the collecting algorithm that is retrieved at step 206, i.e., the same collecting algorithm applied for collecting the characteristic code to be authenticated. The reason for applying the same collecting algorithm is mainly to fulfill the demand of mutual use or communication of terminal devices of different providers. In this example embodiment, since the fingerprint collecting algorithm A002 of the iPhone™ 4S cell phone at step 206 is retrieved. The characteristic code of the registered fingerprint image or the base characteristic code is acquired by applying the JNI method, using the registered fingerprint image file, i.e., the base file, as the input, and calling the functional interface of the fingerprint collecting algorithm A002 in the DLL, which is provided by the manufacturer of the iPhone™ 4S cell phone.

At step 210, the present techniques determine whether or not that the base characteristic code and the characteristic code correspond to the same human biological characteristic. If a result is positive, the request for identification authentication is verified.

After the steps 202 and 208 are completed, the base characteristic code and the characteristic code are acquired. Whether the identity authentication of the person who requests identification authentication is verified is determined by comparing the two characteristic codes by use of the comparing algorithm that corresponds to the collecting algorithm applied at steps 202 and 208. The reason for selecting the comparing algorithm that corresponds to the collecting algorithm is that the comparing process is a complicated matching process. The specific details are already described in the first example embodiment and will be omitted herein. The specific details may be referenced to the first example embodiment.

In this example embodiment, the collecting algorithm A002 of the iPhone™ 4S cell phone is applied at steps 202 and 208 for searching the preset fingerprint recognizing algorithm configuration table, and a comparing algorithm B002 that corresponds to the collecting algorithm A002 of the iPhone™ 4S cell phone is retrieved. Similarly, by using the JNI method, a characteristic code of the registered fingerprint image file, i.e., the base characteristic code, and the characteristic code to be authenticated are used as input, and the functional interface of the fingerprint collecting algorithm B002 in the DLL which is provided by the manufacturer of the iPhone™ 4S cell phone is called to perform a matching operation. The characteristic code to be authenticated and the base characteristic code are compared to determine whether these two codes correspond to the same user according to a similarity degree between the two fingerprint characteristic codes. The matching result will be sent back to the iPhone™ 4S cell phone of Mr. Chang, and thus the remote identity authentication of Mr. Chang is verified so that he is able to proceed to the operations of other remote applications.

In the second example embodiment, Mr. Chang uses a Xiaomi 2S cell phone to register fingerprint information, and then he uses the iPhone™ 4S cell phone to upload the characteristic code to be authenticated. In the existing technology, the characteristic codes uploaded by the two terminal devices are directly matched by the fingerprint verification center system to conclude that they are not from a same user. It will cause the failure of identity authentication of Mr. Chang. By using the example method for performing identity authentication by using human biological characteristics according to the present disclosure, the collecting algorithm of the iPhone™ 4S cell phone that provides the characteristic code to be authenticated is applied for collecting the characteristic code of the registered fingerprint image file of Mr. Chang. The comparing algorithm that corresponds to the collecting algorithm of the iPhone™ 4S cell phone is applied for performing a step of comparing the characteristic code of the registered fingerprint image file, i.e., the base file, with the characteristic code to be authenticated uploaded by the iPhone™ 4S. Since the same collecting algorithm, i.e., the collecting algorithm of the iPhone™ 4S cell phone, and the corresponding comparing algorithm, i.e., the comparing algorithm of the iPhone™ 4S cell phone, are applied, the remote identity authentication of Mr. Chang is successfully verified, and the mutual use or communication of the terminal devices of different providers is achieved.

Figure 3:
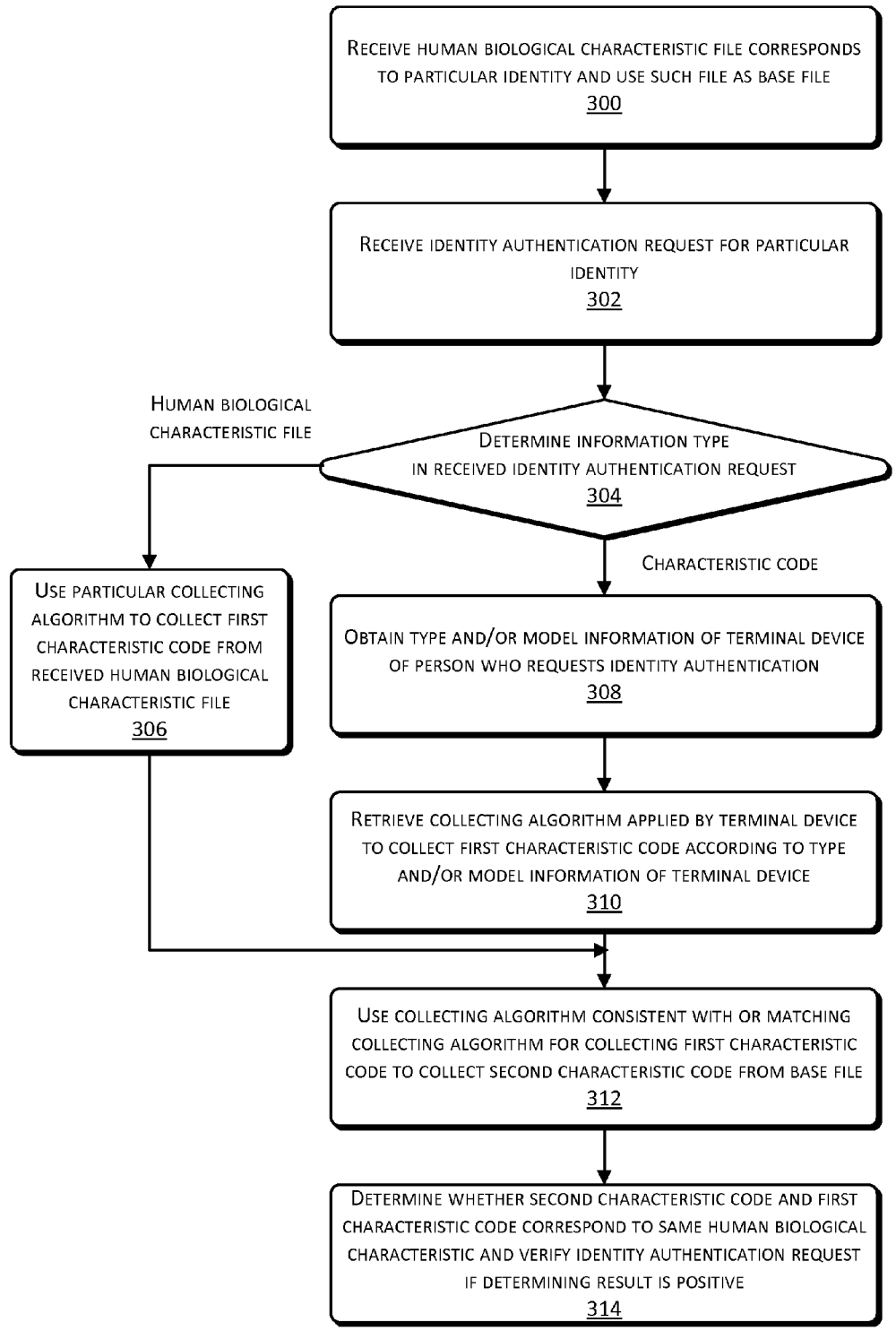
FIG. 3 is a flowchart illustrating a third example method for performing identity authentication by using a human biological characteristic according to a third example embodiment of the present disclosure.

FIG. 3 is a flowchart illustrating an example method for performing identity authentication by using a human biological characteristic according to a third example embodiment of the present disclosure. In this example embodiment, the terminal device of the person who requests identity authentication may provide either a human biological characteristic file of the person who requests identity authentication or a characteristic code to be authenticated of the human biological characteristic of the person who requests identity authentication. The portions of this example embodiment that are the same as those in the first example embodiment and the second example embodiment are not described for the purpose of brevity. The differences of this example embodiment from the other example embodiments are emphasized herein by reference to FIG. 3.

At step 300, a human biological characteristic file of a particular identity is received and is used as a base file.

For example, Mr. Chang uses a Xiaomi 2S cell phone to register fingerprint information. A user identification 0001 of Mr. Chang, a fingerprint image file 0001.jpg to be registered, and type information and/or model information of the Xiaomi 2S cell phone are uploaded by the Xiaomi 2S cell phone and received by the fingerprint verification center system, and are stored in the fingerprint database. Thus, the fingerprint registering process of Mr. Chang is completed.

At step 302, an identity authentication request for a particular identity is received.

The terminal device, which is capable of providing the human biological characteristic file or the characteristic code, is used by the person who requests identity authentication to input his/her human biological characteristic. Then after a necessary pre-processing is applied to the human biological characteristic input by the person who requests identity authentication, a human biological characteristic file is generated. The characteristic code to be authenticated of the person who requests identity authentication may be generated by the terminal device that has a characteristic code collecting function by using its carried collecting algorithm. The identity authentication request is sent. The human biological characteristic file or the characteristic code to be authenticated of the person who requests identity authentication is received by the device or the system of the identity authentication.

In addition to the characteristic code to be authenticated, the identity authentication request sent by the terminal device of the person who requests identity authentication further includes a user identification of the person who requests identity authentication and type information and/or model information of the terminal device of the person who requests identity authentication.

For example, Mr. Chang is required to perform a remote identity authentication when Mr. Chang uses a software application of an iPhone™ 4S cell phone. Mr. Chang inputs his fingerprint image through the fingerprint sensor of the iPhone™ 4S cell phone. Since the iPhone™ 4S cell phone has a function of collecting a fingerprint characteristic code, after a fingerprint image to be authenticated is generated, the iPhone™ 4S cell phone uses its carried fingerprint collecting algorithm A002 to collect the characteristic code to be authenticated from the fingerprint image to be authenticated. Then, the iPhone™ 4S cell phone sends the identity authentication request to the fingerprint verification center system. The request includes the fingerprint image file to be authenticated or 8 the characteristic code to be authenticated, the user identification 0001 of Mr. Chang, and the type information and/or the model information of the iPhone™ 4S cell phone. The fingerprint verification center system receives the information.

At step 304, the present techniques determine whether the received identity authentication request provides the human biological characteristic file of the person who requests identity authentication or the characteristic code that is collected by the person who requests identity authentication through the terminal device of the person who requests identity authentication. If the human biological characteristic file of the person who requests identity authentication is provided, then a step 306 is performed. If the characteristic code that is collected by the person who requests identity authentication through the terminal device of the person who requests identity authentication is provided, then a step 308 is performed.

Since either the human biological characteristic file or the characteristic code to be authenticated of the person who requests identity authentication may be provided in the identity authentication request uploaded by the terminal device, after the identity authentication request is received by the device or the system of identity authentication, the information included in the identity authentication request is read first to determine which type of information to be authenticated is provided by the terminal device and different steps are determined according to the determined type of the information to be authenticated.

For example, when the information uploaded by the iPhone™ 4S cell phone is a fingerprint image file, the step 306 is performed. When the information uploaded by the iPhone™ 4S cell phone is the characteristic code to be authenticated, the step 308 is performed.

At step 306, a characteristic code is collected, by use of a particular collecting algorithm, from the human biological characteristic file of the person who requests identity authentication, and then a step 312 is performed.

Since the terminal provides the human biological characteristic file of the person who requests identity authentication instead of the characteristic code of the person who requests identity authentication to be received, a specific collecting algorithm is applied for collecting the characteristic code to be authenticated from the received human biological characteristic file of the person who requests identity authentication. In order to achieve the mutual use or communication of terminal devices of different providers, the particular collecting algorithm is required to be applied in the subsequent steps to collect the base characteristic code from the base file. For example, the collecting algorithm that corresponds to the terminal device of the person who requests identity authentication, or the collecting algorithm that corresponds to the terminal device that provides the base file, may be used as the particular collecting algorithm.

First, the type and/or model information of the terminal device that provides the human biological characteristic file of the person who requests identity authentication is acquired. Alternatively, the type and/or model information of the terminal device that provides the base file is acquired. The collecting algorithm applied by the terminal device is retrieved according to the type and/or the model information of the terminal device. Finally, by using the retrieved collecting algorithm, the characteristic code is collected from the human biological characteristic file of the person who requests identity authentication. After the characteristic code to be authenticated is collected, the step 312 is performed.

For example, either the Xiaomi 2S cell phone that provides the registered fingerprint image file of Mr. Chang, i.e., the base file, or the iPhone™ 4S cell phone that provides the fingerprint image file to be authenticated of Mr. Chang is selected. In this example, the Xiaomi 2S cell phone is selected. Then, according to the type information and/or the model information of the Xiaomi 2S cell phone, the fingerprint collecting algorithm A001 that corresponds to the Xiaomi 2S cell phone is retrieved by accessing the preset fingerprint recognizing algorithm configuration. Finally, by applying the JNI method, using the registered fingerprint image as the input, and calling functional interface of the fingerprint collecting algorithm A001 in the DLL, which is provided by the manufacturer of the Xiaomi 2S cell phone, the characteristic code of the person who requests identity authentication is obtained. Then, the step 312 is performed.

At step 308, the type and/or model information of the terminal device of the person who requests identity authentication is acquired.

Since the characteristic code of the person who requests identity authentication is provided by the terminal device, the base characteristic code to be authenticated is required to be collected from the base file. In order to achieve the mutual use or communication of terminal devices of different providers, the collecting algorithm applied for collecting the base characteristic code is required to be the same as the collecting for collecting the characteristic code to be authenticated. Therefore, before collecting the base characteristic code, the type information and/or the model information of the terminal device of the person who requests identify authentication needs to be acquired first and then the corresponding collecting algorithm may be selected.

At step 302, in the identity authentication request sent by the terminal device of the person who requests identity authentication, in addition to the characteristic code to be authenticated, the type information and/or the model information of the terminal device is also included. Therefore, through reading the corresponding information in the identity authentication request, the type information and/or the model information of the terminal device iPhone™ 4S cell phone is acquired.

At step 310, according to the type and/or the model information of the terminal device of the person who requests identity authentication, the collecting algorithm applied by the terminal device of the person who requests identity authentication for collecting the characteristic code is retrieved.

For example, a fingerprint collecting algorithm A002 that corresponds to the iPhone™ 4S cell phone is acquired by accessing the preset fingerprint recognizing algorithm configuration table according to the type information and/or the model information of the terminal device of the person who requests identity authentication, i.e., the iPhone™ 4S cell phone.

At step 312, the base characteristic code is collected from the base file. The algorithm applied for collecting the base characteristic code is consistent with or matches the algorithm for collecting the characteristic code of the person who requests identity authentication.

First, a base file of the person who requests identity authentication is read. In this example embodiment, the registered fingerprint image file of Mr. Chang, i.e., the base file, is stored in the fingerprint database at step 300. According to the user identification 0001 provided by Mr. Chang at the step of sending the identity authentication request, a corresponding data record of the user identification 0001 is found by accessing the fingerprint database. After the corresponding data record is found, the storage path and the file name of the registered fingerprint image file are extracted. Then the path is visited and the registered fingerprint image file 0001.jpg is read.

Then, the base characteristic code of the base file is collected. In order to fulfill the demand of mutual use or communication of terminal devices of different providers, the applied collecting algorithm for collecting the base characteristic code is required to be the same as, consistent with, or matches the collecting algorithm applied at the step of collecting the characteristic code to be authenticated. If the human biological characteristic file of the person who requests identity authentication is provided in the identity authentication request, the specific collecting algorithm selected at step 306 should be applied. Otherwise if the characteristic code of the person who requests identity authentication is provided in the identity authentication request, the collecting algorithm which is retrieved at step 310 is applied.

For example, if the fingerprint image file of Mr. Chang is provided in the identity authentication request, then the specific collecting algorithm selected at step 306, i.e., the collecting algorithm A001 that corresponds to the Xiaomi 2S cell phone is applied. Otherwise if the characteristic code to be authenticated of the fingerprint image of Mr. Chang is provided in the identity authentication request, the collecting algorithm which is retrieved at step 310, i.e., the collecting algorithm A002 that corresponds to the iPhone™ 4S cell phone, is applied. Then, by applying the JNI method, using the registered fingerprint image file, i.e., the base file, as the input, and calling the functional interface of the fingerprint collecting algorithm in the DLL, which is provided by the manufacturer of the terminal device, the characteristic code of the registered fingerprint image, i.e., the base characteristic code, is retrieved.

At step 314, the present techniques determine whether or not the base characteristic code and the characteristic code correspond to the same human biological characteristic. If a result is positive, the identity authentication request is verified.

After the above steps are completed, the base characteristic code and the characteristic code are acquired. The comparing algorithm corresponding to the collecting algorithm that collects the base characteristic code and the characteristic code is used to compare the two codes to determine whether the person who requests identity authentication passes the identity authentication. The reason for selecting the comparing algorithm that corresponds to the collecting algorithm is that the comparing process is a complicated matching process. The specific details are already described in the first example embodiment, which are not detailed herein and may be referenced to the first example embodiment.

If the human biological characteristic code of the person who requests identity authentication is provided in the identity authentication request, a comparing algorithm that corresponds to the specific collecting algorithm selected at step 306 is selected. If the characteristic code to be authenticated of the person who requests identity authentication is provided in the identity authentication request, a comparing algorithm that corresponds to the collecting algorithm which is retrieved at step 310 is selected. Then, the selected comparing algorithm is applied to compare the acquired characteristic code to be authenticated with the base characteristic code.

In this embodiment, if the identity authentication request contains the fingerprint image file uploaded by the iPhone™ 4S cell phone, the collecting algorithm A001 of the Xiaomi 2S cell phone is selected at step 306 as the specific collecting algorithm. The preset fingerprint recognizing algorithm configuration table is searched to retrieve the comparing algorithm B001 that corresponds to the collecting algorithm A001 of the Xiaomi 2S cell phone is retrieved. Similarly, if the identity authentication request contains the characteristic code to be authenticated uploaded by the iPhone™ 4S cell phone, the collecting algorithm A002 of the iPhone™ 4S cell phone is retrieved at step 310. The preset fingerprint recognizing algorithm configuration table is searched to retrieve the comparing algorithm B002 that corresponds to the collecting algorithm A002 of the iPhone™ 4S cell phone.

After the comparing algorithm is selected, for example, the JNI method may be applied. The characteristic code of the registered fingerprint image file, i.e., the base characteristic code, and the characteristic code to be authenticated are used as input. The functional interface of the selected comparing algorithm in the DLL which is provided by the manufacturer performs a matching operation is called to compare the fingerprint characteristic codes. The called function, according to similarity degree between the two fingerprint characteristic codes, determines that the characteristic code to be authenticated and the base characteristic code correspond to the same user's fingerprint. The comparing result will be sent back to the iPhone™ 4S cell phone of Mr. Chang, and thus the remote identity authentication of Mr. Chang is verified and he is able to proceed to perform operation of remote applications.

In the third example embodiment, Mr. Chang uses a Xiaomi 2S cell phone to register fingerprint information, and then he uses an iPhone™ 4S cell phone to upload the fingerprint image file or the characteristic code to be authenticated. Under the conventional technology, the characteristic codes uploaded by the two terminal devices are directly compared by the fingerprint verification center system, and the fingerprint verification center system will conclude that these two codes are not from the same user, which will cause the failure of identity authentication of Mr. Chang. By using the example method for performing identity authentication by using human biological characteristics according to the present disclosure, the fingerprint verification center system firstly determines the type of the information to be authenticated provided by the terminal device of the person who requests identity authentication and, according to the two different type of information to be authenticated, perform their respective corresponding operations. For example, the same collecting algorithm is applied for collecting the characteristic code from the registered fingerprint image file, i.e., the base characteristic code, and the characteristic code to be authenticated from the fingerprint image file to be authenticated. Thereafter, the comparing algorithm that corresponds to the collecting algorithm is applied to compare the two characteristic codes. Thus, according to a comparing result, Mr. Chang successfully passes the identity authentication, thereby implementing mutual use or communication of the terminal devices of different providers.

In the above three example embodiments, the present disclosure provides example method for performing identity authentication by using human biological characteristic. Correspondingly, the present disclosure also provides example devices for performing identity authentication by using human biological characteristic. Since the device embodiments are similar to the method embodiments, they are briefly described. The relevant portions of the example device embodiments may be referenced to the corresponding portions in the example method embodiments. The following example device embodiments are merely illustrative.

Figure 4:
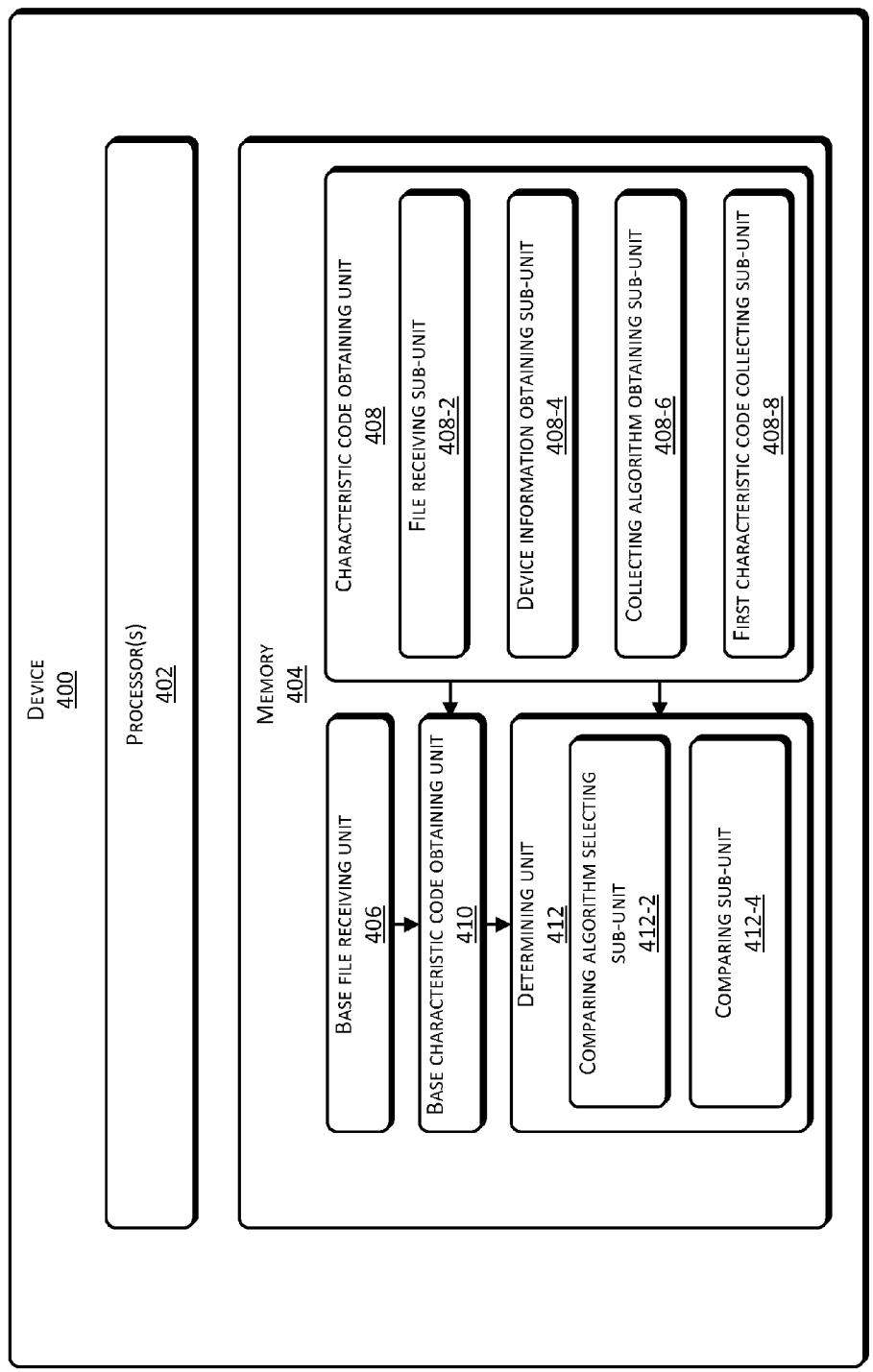
FIG. 4 is a block diagram of a first example device for performing identity authentication by using a human biological characteristic according to a fourth example embodiment of the present disclosure.

FIG. 4 is a block diagram of an example device 400 for performing identity authentication by using a human biological characteristic according to a fourth example embodiment of the present disclosure. As shown in FIG. 4, the device 400 may include one or more processor(s) 402 or data processing unit(s) and memory 404. The memory 404 is an example of computer-readable media. The memory 404 may store therein a plurality of modules including a base file receiving unit 406, a characteristic code obtaining unit 408, a base characteristic code collecting unit 410, and a determining unit 412.

The base file receiving unit 406 receives a human biological characteristic file corresponding to a particular identity and uses such file as a base file.

For example, the base file receiving unit 406 receives the human biological characteristic file of a particular user, which is provided by the terminal device, and stores the file to complete the registration process of the human biological characteristic of the particular user. The registered human biological characteristic file is used as the base file for subsequent identity authentication. In addition to receiving the human biological characteristic file, the base file receiving unit 406 further receives a user identification of the particular user, and type information and/or model information of the terminal device that provides the base file.

The characteristic code obtaining unit 408 obtains a human biological characteristic file of a person who request identity authentication and collects a characteristic code from the human biological characteristic of the person who requests identity authentication.

For example, the characteristic code obtaining unit 408 may include a file receiving sub-unit 408-2, a device information obtaining sub-unit 408-4, a collecting algorithm obtaining sub-unit 408-6, and a first characteristic code collecting sub-unit 408-8.

The file receiving sub-unit 408-2 receives the human biological characteristic file of the person who requests identity authentication, and further receives the user identification of the person who requests identity authentication, and the type information and/or the model information of the terminal device of the person who requests identity authentication.

The device information obtaining sub-unit 408-4 obtains the type information and/or model information of the terminal device, which is used by the person who requests identity authentication, that provides the human biological characteristic file of the person who requests identity authentication, or the type and/or model information of the terminal device that provides the base file.

In order to achieve the mutual use or communication of terminal devices of different providers, a same or matching collecting algorithm is required to be applied at the steps of collecting the base characteristic code and the characteristic code to be authenticated. At this step, for example, the present techniques may select the collecting algorithm that corresponds to the terminal device providing the base file, or the collecting algorithm that corresponds to the terminal device of the person who requests identity authentication. The device information obtaining sub-unit 408-4 may select either of the above two terminal devices, and obtain the type information and/or the model information of the selected terminal device.

The collecting algorithm obtaining sub-unit 408-6 retrieves or obtains the collecting algorithm of the terminal device according to the type and/or the model information of the terminal device output by the device information obtaining sub-unit 408-4.

The first characteristic code collecting sub-unit 408-8 applies the collecting algorithm output by the collecting algorithm obtaining sub-unit 408-6 as a particular collecting algorithm, and uses the particular collecting algorithm to collect the characteristic code from the human biological characteristic file of the person who requests identity authentication.

The base characteristic code collecting unit 410 reads the base file which is received by the base file receiving unit 406, and collects a base characteristic code from the base file. The algorithm applied for collecting the base characteristic code is the same as or consistent with the collecting algorithm applied by the characteristic code obtaining unit 408.

For example, before the step of collecting the base characteristic code, firstly, stored human biological characteristic data will be searched according to the user identification of the person who requests identity authentication, which is received by the file receiving sub-unit 408-2. The base file that corresponds to the user identification of the person who requests identity authentication is retrieved and the type information and/or model information of the terminal device that provides the base file corresponding to the user identification of the person who requests identity authentication is also retrieved.

In order to achieve the mutual use or communication of terminal devices of different providers, a same or matching collecting algorithm is required to be applied at the steps of collecting the base characteristic code and the characteristic code to be authenticated. In this example embodiment, the collecting algorithm output by the collecting algorithm obtaining sub-unit 408-6 may be applied by the first characteristic code collecting sub-unit 408-8 at the step of collecting the characteristic code. Thus the collecting algorithm output by the collecting algorithm obtaining sub-unit 408-6 is also applied by the base characteristic code collecting unit 410 to collect the base characteristic code from the base file.

The determining unit 412 determines whether the base characteristic code and the characteristic code correspond to the same human biological characteristic and outputs a determining result.

The determining unit 412 may include a comparing algorithm selecting sub-unit 412-2 and a comparing sub-unit 412-4.

The comparing algorithm selecting sub-unit 412-2 selects a comparing algorithm that corresponds to the collecting algorithm applied by the characteristic code collecting unit 408 and the base characteristic code collecting unit 410.

The comparing process of the characteristic code is a matching process, in which the similarity degree of the two characteristic codes is determined. The comparing algorithm is expected to accurately identify the information such as type, location, a number of the characteristic points in the characteristic codes. Thus, the comparing algorithm that corresponds to the collecting algorithm should be applied in order to enhance the accuracy of the matching process.

For example, the collecting algorithm output by the collecting algorithm obtaining sub-unit 408-6 is applied in both steps of collecting the base characteristic code and collecting the characteristic code to be authenticated. Thus the comparing algorithm selecting sub-unit 412-2 searches a preset human biological characteristic recognition algorithm configuration table to retrieve the comparing algorithm that corresponds to the collecting algorithm output by the collecting algorithm obtaining sub-unit 408-6.

The comparing sub-unit 412-4 compares, by using the comparing algorithm, whether the base characteristic code and the characteristic code correspond to the same human biological characteristics and outputs the determining result.

For example, the comparing sub-unit 412-4 receives he characteristic code output by the first characteristic code collecting sub-unit 408-8 and the base characteristic code output by the base characteristic code collecting unit 410, uses the comparing algorithm retrieved by the comparing algorithm selecting sub-unit 412-2 to compare the characteristic code to be authenticated and the base characteristic code, and determines whether the base characteristic code and the characteristic code correspond to the same human biological characteristic and outputs the determining result.

Figure 5:
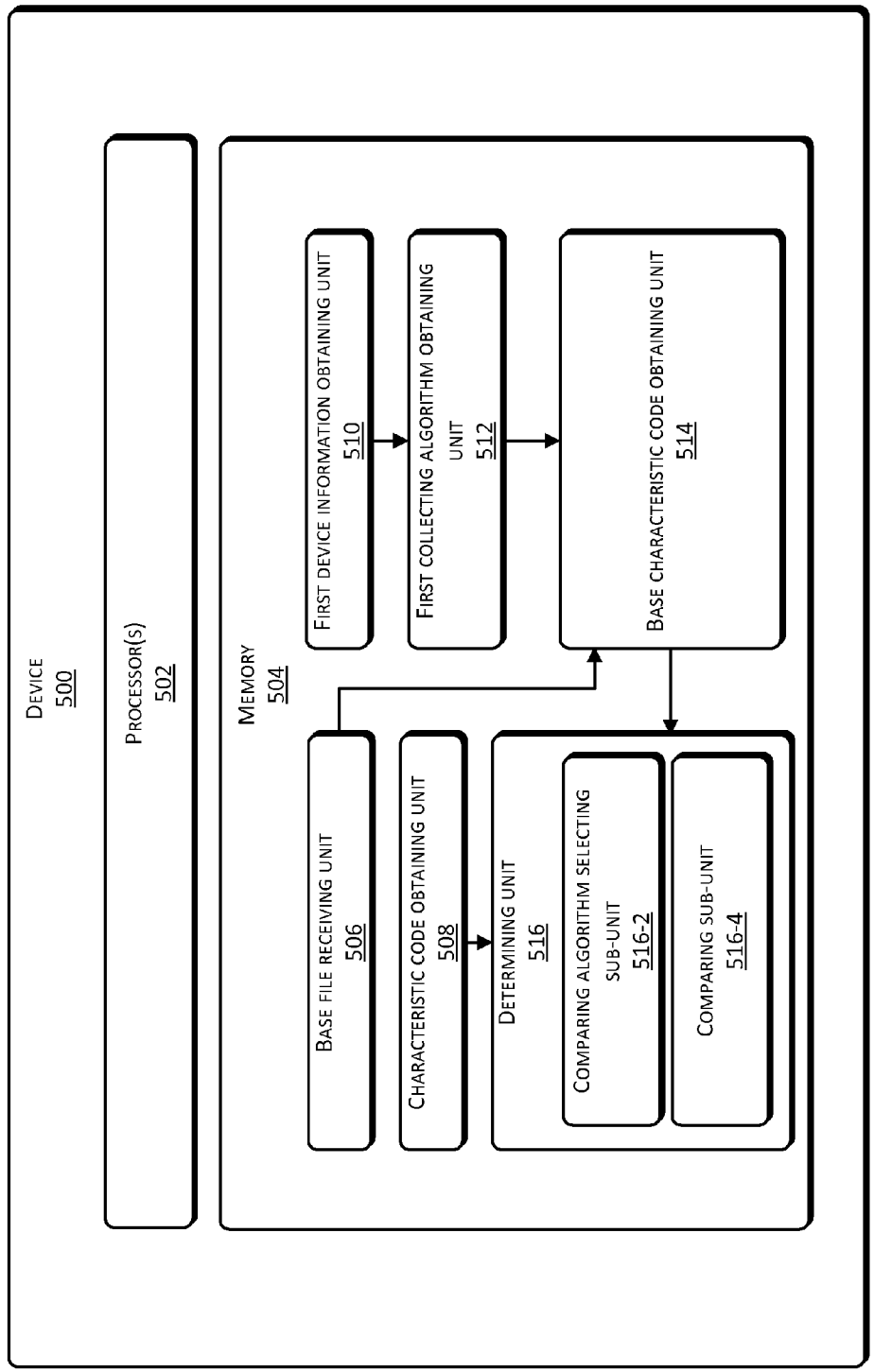
FIG. 5 is a block diagram of a second example device for performing identity authentication by using a human biological characteristic according to a fifth example embodiment of the present disclosure.

FIG. 5 is a block diagram of an example device 500 for performing identity authentication by using a human biological characteristic according to a fifth example embodiment of the present disclosure. The portions of the fifth example embodiment that are the same as or similar to the fourth example embodiment are omitted herein, and the related descriptions may be referred to the fourth embodiment.

As shown in FIG. 5, the device 500 may include one or more processor(s) 502 or data processing unit(s) and memory 504. The memory 504 is an example of computer-readable media. The memory 504 may store therein a plurality of modules including a base file receiving unit 506, a characteristic code obtaining unit 508, a first device information obtaining unit 510, a first collecting algorithm obtaining unit 512, a base characteristic code collecting unit 514, and a determining unit 516.

The base file receiving unit 506 receives a human biological characteristic file corresponding to a particular identity and uses such file as a base file.

The characteristic code obtaining unit 508 receives a characteristic code of human biological characteristic which is collected by a person who requests identity authentication through a terminal device of the person who requests identity authentication.

The first device information obtaining unit 510 obtains type and/or model information of the terminal device of the person who requests identity authentication.

In order to achieve the mutual use or communication of terminal devices of different providers, a same or matching collecting algorithm is required to be applied at the steps of collecting the base characteristic code and the characteristic code to be authenticated. In this example embodiment, the characteristic code, which is collected from the human biological characteristics collected by the terminal device of the person who requests identity authentication, is received by the characteristic code obtaining unit 508. Correspondingly, the collecting algorithm that corresponds to the terminal device of the person who requests identity authentication should be selected for collecting the base characteristic code from the base file. Accordingly, the type and/or the model information of the terminal device that requests identity authentication needs to be obtained at first.

The first collecting algorithm obtaining unit 512 retrieves, according to the type and/or the model information of the terminal device that requests identity authentication, the collecting algorithm that is applied by the terminal device to collect the characteristic code.

The first collecting algorithm obtaining unit 512 receives the type and/or the model information of the terminal device that requests identity authentication output by the first device information obtaining unit 510, searches preset human biological characteristic recognition algorithm configuration information, and retrieves the collecting algorithm that corresponds to the type information and/or the model information of the terminal device of the person who request identity authentication.

The base characteristic code collecting unit 514 reads the base file which is received by the base file receiving unit 506, and collects the base characteristic code from the base file. The collecting algorithm for collecting the base characteristic code is the same as or consistent with the collecting algorithm applied by the characteristic code obtaining unit 508.

In order to achieve the mutual use or communication of terminal devices of different providers, a same or matching collecting algorithm is required to be applied at the steps of collecting the base characteristic code and the characteristic code to be authenticated. In this embodiment, the characteristic code of the person who requests identity authentication is received by the characteristic code obtaining unit 508. The collecting algorithm that corresponds to the type and/or the model information of the terminal device of the person who requests identity authentication is retrieved and output by the first collecting algorithm obtaining unit 512. The base characteristic code collecting unit 514 receives the collecting algorithm output by the first collecting algorithm obtaining unit 512 and uses the collecting algorithm to collect the base characteristic code from the base file.

The determining unit 516 determines whether the base characteristic code and the characteristic code correspond to the same human biological characteristics and outputs a determining result.

For example, the determining unit 516 may includes a comparing algorithm selecting sub-unit 516-2 and a comparing sub-unit 516-4.

The comparing algorithm selecting sub-unit 516-2 selects a comparing algorithm that corresponds to the collecting algorithm applied by the characteristic code collecting unit 508 and the base characteristic code collecting unit 514.

In this example embodiment, the characteristic code of the person who requests identity authentication is received by the characteristic code obtaining unit 508. The collecting algorithm that corresponds to the type and/or the model information of the terminal device of the person who requests identity authentication output by the first collecting algorithm obtaining unit 512 is applied by the base characteristic code collecting unit 514 at the step of collecting the base characteristic code. Thus the comparing algorithm selecting sub-unit 516-2 searches preset human biological characteristic recognition algorithm configuration information to retrieve the comparing algorithm that corresponds to the collecting algorithm output by the first collecting algorithm obtaining unit 512.

The comparing sub-unit 516-4 compares, by using the comparing algorithm, whether the base characteristic code and the characteristic code correspond to the same human biological characteristic and outputs the determining result.

For example, the comparing sub-unit 516-4 receives the characteristic code output by the characteristic code obtaining unit 508 and the base characteristic code output by the base characteristic code collecting unit 512, uses the comparing algorithm retrieved by the comparing algorithm selecting sub-unit 516-2 to compare the characteristic code to be authenticated with the base characteristic code, determines whether the base characteristic code and the characteristic code correspond to the same human biological characteristics, and outputs the determining result.

Figure 6:
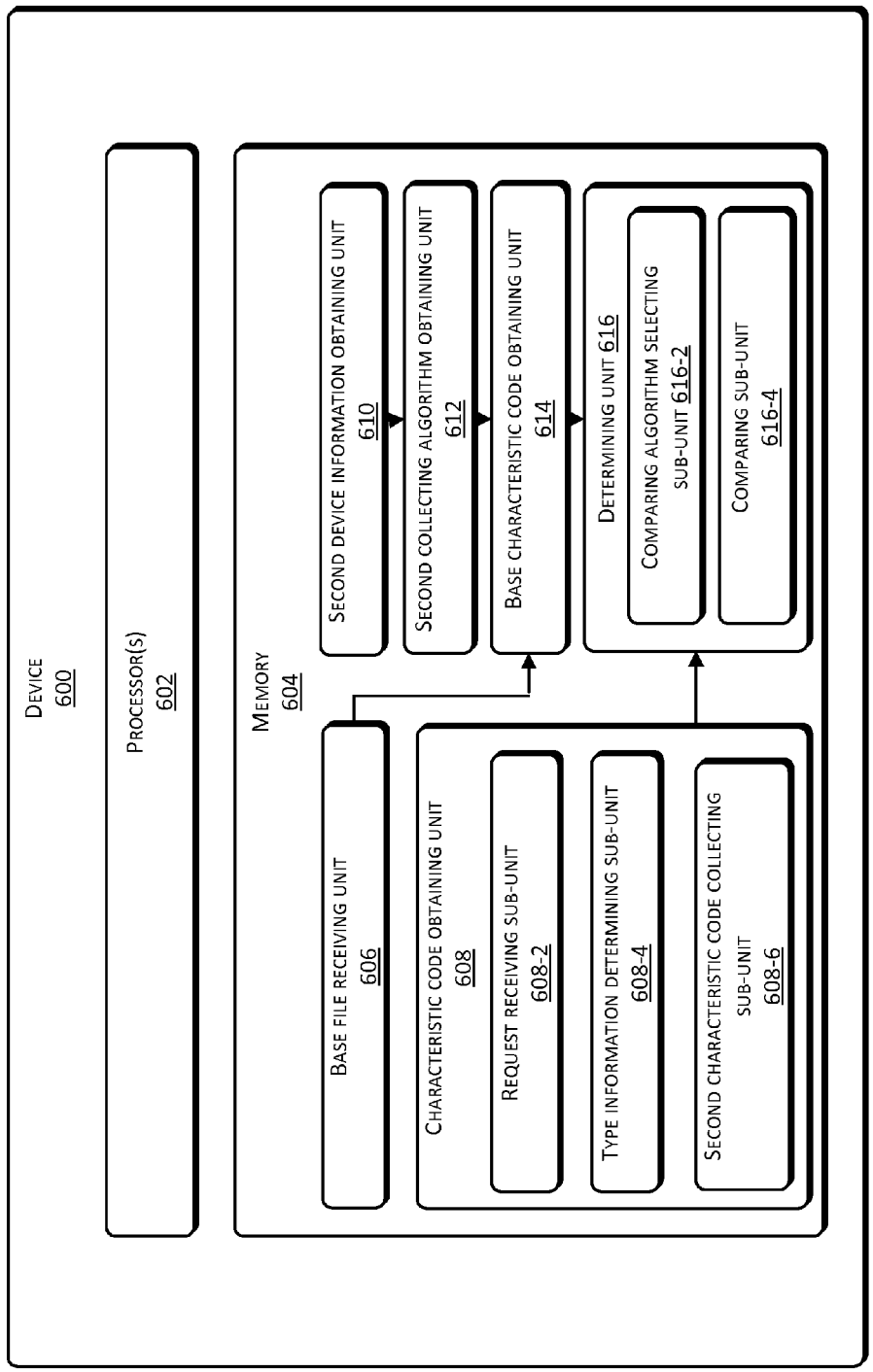
FIG. 6 is a block diagram of a third example device for performing identity authentication by using a human biological characteristic according to a sixth example embodiment of the present disclosure.

FIG. 6 is a block diagram of an example device for performing identity authentication by using a human biological characteristic according to a sixth example embodiment of the present disclosure. The portions of the sixth example embodiment that are the same as or similar to the fourth and/or the fifth example embodiments are omitted herein, and the related descriptions may be referred to the fourth and/or the fifth example embodiments.

As shown in FIG. 6, the device 600 may include one or more processor(s) 602 or data processing unit(s) and memory 604. The memory 604 is an example of computer-readable media. The memory 604 may store therein a plurality of modules including a base file receiving unit 606, a characteristic code obtaining unit 608, a second device information obtaining unit 610, a second collecting algorithm obtaining unit 612, a base characteristic code collecting unit 614, and a determining unit 616.

The base file receiving unit 606 receives a human biological characteristic file of a particular identity and uses such file as a base file.

The characteristic code obtaining unit 608 obtains a characteristic code according to a human biological characteristic of a person who requests identity authentication when an identity authentication request for the particular identity is received.

For example, the characteristic code obtaining unit 608 may include a request receiving sub-unit 608-2, a type information determining sub-unit 608-4, and a second characteristic code collecting sub-unit 608-6.

The request receiving sub-unit 608-2 receives the identity authentication request for the particular identity, which may include a human biological characteristic file or a characteristic code of a human biological characteristic of the person who requests identity authentication, a user identification of the person who requests identity authentication, and type information and/or model information of the terminal device of the person who requests identity authentication.

The type determining unit 608-4 determines whether the received identity authentication request provides the human biological characteristic file of the person who requests identity authentication, or the characteristic code of the person who requests identity authentication that is collected by the person who requests identity authentication through the terminal device of the person who requests identity authentication.

When the result determined by the type determining unit 608-4 is the human biological characteristic file provided by the person who requests identity authentication, the second characteristic code collecting sub-unit 608-6 activates and collects, by using a particular collecting algorithm, to collect the characteristic code from the received human biological characteristic file of the person who requests identity authentication.

In order to achieve the mutual use or communication of terminal devices of different providers, a same or matching collecting algorithm is required to be applied at the steps of collecting the base characteristic code and the characteristic code to be authenticated. For example, the present techniques may select either a collecting algorithm that corresponds to the terminal device providing the base file, or a collecting algorithm that corresponds to the terminal device of the person who requests identity authentication. Therefore, in this example embodiment, the second characteristic code collecting sub-unit 608-6 selects one from the above terminal devices, acquires the type information and/or the model information of the selected terminal device, searches preset human biological characteristic recognition algorithm configuration information to retrieve a collecting algorithm that corresponds to the type information and/or the model information of the selected terminal device as the particular collecting algorithm, and collects, by using the particular collecting algorithm, the characteristic code from the human biological characteristic file of the person who requests identity authentication. The second characteristic code collecting sub-unit 608-6 outputs the particular collecting algorithm to the base characteristic code collecting unit 614. The base characteristic code collecting unit 614 applies the same or matching collecting algorithm to collect the base characteristic code from the base file.

When the result determined by the type determining unit 608-4 is the characteristic code of the human biological characteristic collected by the terminal device of the person who requests identity authentication, the second device information obtaining unit 610 activates and retrieves the type and/or model information of the terminal device that requests identity authentication.

When the result determined by the type determining unit 608-4 is the characteristic code of the human biological characteristic collected by the terminal device of the person who requests identity authentication, the second collecting algorithm obtaining unit 612 activates and retrieves, according to the type and/or the model information of the terminal device of the person who requests identity authentication, the collecting algorithm which is applied by the terminal device to collect the characteristic code.

The base characteristic code collecting unit 614 reads the base file which is received by the base file receiving unit 606, and collects a base characteristic code from the base file. The collecting algorithm for collecting the base characteristic code is the same as or consistent with the collecting algorithm applied by the characteristic code obtaining unit 608.

In this example embodiment, when the result determined by the type determining sub-unit 608-4 is the human biological characteristic file which is provided by the person who requests identity authentication, the base characteristic code 614 receives the particular collecting algorithm output from the second characteristic code collecting sub-unit 608-6 to collect the base characteristic code from the base file. When the result determined by the type determining unit 608-4 is the characteristic code of the human biological characteristic collected by the terminal device of the person who requests identity authentication, the base biological characteristic unit 614 receives the collecting algorithm that corresponds to the terminal device of the person who requests identity authentication, which is output by the second collecting algorithm obtaining unit 612 to collect the base characteristic code from the base file.

The determining unit 616 determines whether the base characteristic code and the characteristic code correspond to the same human biological characteristics and outputs a determining result.

For example, the determining unit 616 may includes a comparing algorithm selecting sub-unit 616-2 and a comparing sub-unit 616-4.

The comparing algorithm selecting sub-unit 616-2 selects a comparing algorithm that corresponds to the collecting algorithm applied by the characteristic code collecting unit 608 and the base characteristic code collecting unit 614.

In this example embodiment, when the result determined by the type determining unit 608-4 is the human biological characteristic file which is provided by the person who requests identity authentication, the comparing algorithm selecting sub-unit 616-2 retrieves, from the preset human biological characteristic recognition algorithm configuration information, a comparing algorithm that corresponds to the particular collecting algorithm output by the second characteristic code obtaining sub-unit 608-6. When the result determined by the type determining unit 608-4 is the characteristic code of the human biological characteristic which is provided by the person who requests identity authentication and collected by the terminal device of the person who requests identity authentication, the comparing algorithm selecting sub-unit 616-2 retrieves, from the preset human biological characteristic recognition algorithm configuration information, a comparing algorithm that corresponds to the particular collecting algorithm output by the second collecting algorithm obtaining unit 612.

The comparing sub-unit 616-4 compares, by using the comparing algorithm, whether the base characteristic code and the characteristic code correspond to the same human biological characteristics and outputs the determining result.

The comparing sub-unit 616-4 receives the characteristic code output by the characteristic code obtaining sub-unit 608 and the base characteristic code output by the base characteristic code collecting unit 614, uses the comparing algorithm retrieved by the comparing algorithm selecting sub-unit 616-2 to compare the characteristic code with the base characteristic code, determines whether the base characteristic code and the characteristic code correspond to the same human biological characteristics, and outputs the determining result.

The example embodiments of the present disclosure are disclosed as above. However, the example embodiments are not to be construed as any limitations to the present disclosure. Any person of ordinary skill in the art is able to perform modifications without changing the spirit and the scope of the present disclosure. Therefore, the protection scope of the present disclosure should follow the scope of the claims of the present disclosure.

In a standard configuration, a computing device, such as the device, terminal device, server, or system, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but not limited to, disk, CD-ROM, or optical storage device) that include computer-executable or computer-readable instructions.

What is claimed is:

1. A method comprising:
receiving a human biological characteristic file of a particular identity as a base file from a first computing device;
receiving a request for an identity authentication corresponding to the particular identity from a second computing device, the first computing device and the second computing device using different collecting algorithms to collect a first characteristic code from the base file, the request associated with a human biological characteristic file of a person who requests the identity authentication or a second characteristic code corresponding to a human biological characteristic of the person who requests the identity authentication;
obtaining the second characteristic code;
determining a collecting algorithm corresponding to the second computing device;
collecting the first characteristic code from the base file that is received from the first computing device by using the collecting algorithm corresponding to the second computing device;
determining whether the second characteristic code and the first characteristic code correspond to a same human biological characteristic; and
verifying the request for the identity authentication in response to determining that the second characteristic code and the first characteristic code correspond to the same human biological characteristic.

2. The method of claim 1, wherein the obtaining the second characteristic code corresponding to the human biological characteristic of the person who requests the identity authentication comprises:
receiving the human biological characteristic file of the person who requests the identity authentication; and
using the collecting algorithm to collect the second characteristic code from the human biological characteristic file of the person who requests the identity authentication.

3. The method of claim 2, further comprising:
prior to using the collecting algorithm to collect the second characteristic code from the human biological characteristic file of the person who requests the identity authentication, obtaining type or model information of the second computing device that provides the human biological characteristic file of the person who requests identity authentication or a terminal device that provides the base file,
wherein the determining the collecting algorithm corresponding to the second computing device includes:
obtaining a particular collecting algorithm according to the type or model information of the second computing device; and
using the particular collecting algorithm as the collecting algorithm.

4. The method of claim 1, further comprising obtaining the second characteristic code corresponding to the human biological characteristic of the person who requests the identity authentication from the second computing device.

5. The method of claim 4, further comprising:
prior to collecting the second characteristic code,
obtaining type or model information of the second computing device;
obtaining a particular collecting algorithm according to the type or model information of the second computing device; and using the particular collecting algorithm as the collecting algorithm.

6. The method of claim 1, further comprising:
after receiving the request for the identity authentication corresponding to the particular identity, determining whether the request for the identity authentication is associated with the human biological characteristic file of the person who requests the identity authentication or the first characteristic code corresponding to the human biological characteristic of the person who requests the identity authentication that is collected through the terminal device of the person who requests the identity authentication,
in response to determining that the request for the identity authentication provides the human biological characteristic file of the person who requests the identity authentication,
using the collecting algorithm to collect the second characteristic code from the human biological characteristic file of the person who requests the identity authentication.

7. The method of claim 6, further comprising:
in response to determining that the request for the identity authentication is associated with the second characteristic code corresponding to the human biological characteristic of the person who requests the identity authentication,
obtaining type or model information of the second computing device; and
obtaining the collecting algorithm according to the type or model information of the second computing device.

8. The method of claim 1, wherein the determining whether the second characteristic code and the first characteristic code correspond to the same human biological characteristic comprises:
using a comparing algorithm that corresponds to the collecting algorithm to compare the second characteristic code with the first characteristic code; and
determining that the second characteristic code and the first characteristic code correspond to the same human biological characteristic according to a result of comparison.

9. The method of claim 1, wherein the human biological characteristic includes at least one of:
a fingerprint;
a human face;
a facial characteristic;
a palm print; and
a voice pattern.

10. The method of claim 1, wherein the human biological characteristic file includes an image file or an audio file.

11. A device comprising:
a base file receiving unit that receives a human biological characteristic file of a particular identity as a base file from a first computing device;
a characteristic code obtaining unit that receives a request for an identity authentication corresponding to the particular identity from a second computing device, the first computing device and the second computing device using different collecting algorithms to collect a first characteristic code from the base file, the request associated with a human biological characteristic file of a person who requests the identity authentication or a second characteristic code corresponding to a human biological characteristic of the person who requests the identity authentication;

a base characteristic collecting unit that obtains the second characteristic code, determines a collecting algorithm corresponding to the second computing device, and collects the first characteristic code from the base file that is received from the first computing device by using the collecting algorithm corresponding to the second computing device; and
a determining unit that determines that the second characteristic code and the first characteristic code correspond to a same human biological characteristic and verifies the request for the identity authentication.

12. The device of claim 11, wherein the characteristic code obtaining unit comprises:
a file receiving unit that receives the human biological characteristic file of the person who requests the identity authentication; and
a first characteristic code collecting sub-unit that uses the collecting algorithm to collect the second characteristic code from the human biological characteristic file of the person who requests the identity authentication.

13. The device of claim 12, wherein the characteristic code obtaining unit further comprises:
a device information obtaining sub-unit that obtains type or model information of the second computing device that provides the human biological characteristic file of the person who requests identity authentication or a terminal device that provides the base file; and
a collecting algorithm obtaining sub-unit that obtains the collecting algorithm according to the type or model information of the terminal device.

14. The device of claim 11, wherein the characteristic code obtaining unit receives the second characteristic code corresponding to the human biological characteristic of the person who requests the identity authentication collected through a second computing device.

15. The device of claim 11, wherein:
the characteristic obtaining unit comprises:
a request receiving sub-unit that receives the request for the identity authentication corresponding to the particular identity;
a type information determining sub-unit that determines that the request for the identity authentication provides the human biological characteristic file of the person who requests the identity authentication; and
a second characteristic code collecting sub-unit that uses a particular collecting algorithm to collect the second characteristic code from the human biological characteristic file of the person who requests the identity authentication.

16. The device of claim 11, wherein the characteristic obtaining unit comprises:
a request receiving sub-unit that receives the request for the identity authentication corresponding to the particular identity;
a type information determining sub-unit that determines that the request for the identity authentication provides the first characteristic code corresponding to the human biological characteristic of the person who requests the identity authentication collected through a terminal device of the person requests the identity authentication; and
the device further comprises:
a second device information obtaining unit that obtains type or model information of the second computing device of the person who requests the identity authentication; and a second collecting algorithm obtaining unit that obtains the collecting algorithm according to the type or model information of the second computing device of the person who requests the identity authentication.

17. The device of claim 11, wherein the determining unit comprises:

a comparing algorithm selecting sub-unit that uses a comparing algorithm that corresponds to the collecting algorithm to compare the second characteristic code with the first characteristic code; and a determining sub-unit that determines that the second characteristic code and the first characteristic code correspond to the same human biological characteristic according to a result of comparison.

18. The device of claim 11, wherein the human biological characteristic includes at least one of:

a fingerprint;

a human face;

a facial characteristic;

a palm print; and a voice pattern.

19. The device of claim 11, wherein the human biological characteristic file includes an image file or an audio file.

20. One or more memories stored thereon computer-executable instructions executable by one or more processors to perform operations comprising:

receiving a human biological characteristic file of a particular identity as a base file from a first computing device;

receiving a request for an identity authentication corresponding to the particular identity from a second computing device, the first computing device and the second computing device having different type or model information, the request associated with a human biological characteristic file of a person who requests the identity authentication or a second characteristic code corresponding to a human biological characteristic of the person who requests the identity authentication;

obtaining the second characteristic code;

determining a collecting algorithm corresponding to the second computing device according to type or model information of the second computing device;

collecting a first characteristic code from the base file that is received from the first computing device by using the collecting algorithm corresponding to the second computing device;

determining whether the second characteristic code and the first characteristic code correspond to a same human biological characteristic; and verifying the request for the identity authentication in response to determining that the second characteristic code and the first characteristic code correspond to the same human biological characteristic.

* * * * *